(12) United States Patent
Cheng

(10) Patent No.: US 12,081,560 B2
(45) Date of Patent: Sep. 3, 2024

(54) METHOD AND APPARATUS FOR PREVENTING ADVERTISEMENT-RELATED FRAUD, ELECTRONIC DEVICE, AND STORAGE MEDIUM

(71) Applicant: TENCENT TECHNOLOGY (SHENZHEN) COMPANY LIMITED, Guangdong (CN)

(72) Inventor: Quan Cheng, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 573 days.

(21) Appl. No.: 17/214,139

(22) Filed: Mar. 26, 2021

(65) Prior Publication Data

US 2021/0218761 A1    Jul. 15, 2021

Related U.S. Application Data

(63) Continuation of application No. PCT/CN2020/071413, filed on Jan. 10, 2020.

(30) Foreign Application Priority Data

Jan. 11, 2019 (CN) .......................... 201910027586.3

(51) Int. Cl.
*H04L 9/40* (2022.01)
*G06F 21/57* (2013.01)
*G06F 21/64* (2013.01)

(52) U.S. Cl.
CPC .......... *H04L 63/1416* (2013.01); *G06F 21/57* (2013.01); *G06F 21/645* (2013.01); *H04L 63/1483* (2013.01)

(58) Field of Classification Search
None
See application file for complete search history.

(56) References Cited

U.S. PATENT DOCUMENTS 10,320,816 B1 *  6/2019  Smith .................. H04L 63/168
10,679,244 B1 *  6/2020  Bhowmick ........ G06Q 30/0277
(Continued)

FOREIGN PATENT DOCUMENTS

CN        101093510 A      12/2007
CN        106022834 A      10/2016
(Continued)

OTHER PUBLICATIONS

Berrar et. al. "Random forests for the detection of click fraud in online mobile advertising", International Workshop on Fraud Detection in Mobile Advertising (FDMA) 2012 Submitted Feb. 2011; Published Feb. 2011 (Year: 2012).*

(Continued)

*Primary Examiner* — Bassam A Noaman
(74) *Attorney, Agent, or Firm* — ArentFox Schiff LLP

(57) ABSTRACT

Embodiments of this application provide a method and apparatus for preventing advertisement-related fraud, an electronic device, and a storage medium. The method may include obtaining behavior source information of a current advertisement response behavior, the behavior source information being information used for indicating a generation source of the current advertisement response behavior. The method can further include determining whether the behavior source information of the current advertisement response behavior is fraudulent behavior source information based on a similarity between the behavior source information of the current advertisement response behavior and known fraudulent behavior source information, and determining that the current advertisement response behavior is an advertisement-related fraudulent behavior when that the behavior (Continued)

source information of the current advertisement response behavior is the fraudulent behavior source information.

16 Claims, 5 Drawing Sheets

(56) References Cited

U.S. PATENT DOCUMENTS

| | | | |
|---|---|---|---|
| 11,360,875 B2* | 6/2022 | Wang | G06F 21/10 |
| 2007/0073579 A1* | 3/2007 | Immorlica | G06Q 30/0248 |
| | | | 705/14.47 |
| 2017/0185921 A1* | 6/2017 | Zhang | G06N 20/00 |
| 2018/0253755 A1 | 9/2018 | Cheng et al. | |
| 2019/0114649 A1* | 4/2019 | Wang | G06Q 30/0248 |
| 2019/0130440 A1* | 5/2019 | Qiu | G06Q 30/0248 |

FOREIGN PATENT DOCUMENTS

| | | |
|---|---|---|
| CN | 106204108 A | 12/2016 |
| CN | 108229749 A | 6/2018 |
| CN | 109003137 A | 12/2018 |
| CN | 109165691 A | 1/2019 |
| JP | 2018536956 | 12/2018 |
| WO | 2017202336 | 11/2017 |

OTHER PUBLICATIONS

International Search Report issued Apr. 15, 2020 in Application No. PCT/CN2020/071413, (6 pages).

Written Opinion issued Apr. 15, 2020 in Application No. PCT/CN2020/071413. (3 pages).

Chinese Office Action issued in Application No. 201910027586.3, mailed Jan. 3, 2024, with English Translation, 29 pages.

\* cited by examiner

METHOD AND APPARATUS FOR PREVENTING ADVERTISEMENT-RELATED FRAUD, ELECTRONIC DEVICE, AND STORAGE MEDIUM

RELATED APPLICATION

This application is a continuation of International Application No. PCT/CN2020/071413, filed on Jan. 10, 2020, which claims priority to Chinese Patent Application No. 201910027586.3, entitled "METHOD AND APPARATUS FOR PREVENTING ADVERTISEMENT-RELATED FRAUD, ELECTRONIC DEVICE, AND STORAGE MEDIUM" and filed on Jan. 11, 2019. The entire disclosures of the prior applications are hereby incorporated by reference in their entirety.

FIELD OF THE TECHNOLOGY

This application relates to the field of network technologies, including to a method and apparatus for preventing advertisement-related fraud, an electronic device, and a storage medium.

BACKGROUND OF THE DISCLOSURE

Advertisers need to push advertisements to users, to advertise products or services. Currently, accompanied with wide use of networks and computers, online advertising has become a new form of placing advertisements. In an online advertising system, an advertiser pays fees to an advertisement publisher to place advertisements via a web page, a browser, an application (APP), or another online media.

In a common advertisement charging method, the advertiser usually only needs to pay for advertisement response behaviors, for example advertisement clicking behaviors, of users, and does not need to pay for exposure of the advertisements. For example, in a cost per click (CPC) advertisement charging method, the advertiser only pays for a behavior of clicking on an advertisement by a user, and does not pay for exposure of the advertisement. For the advertiser, a risk that the advertisement is only exposed, but no actual operation is performed by users is avoided by using such a payment method. Because the advertiser performs payment based on response behaviors generated by users for the advertisement, the advertiser hopes that all advertisement response behaviors paid by the advertiser are all effective behaviors of actual users instead of fraudulent behaviors. In addition, a traffic master, that is, a carrier providing user traffic, such as media, a website, or an official account, may gain a portion of advertising profits. In the same advertisement exposure, a larger quantity of times of response of users for an advertisement indicates more profits gained by the traffic master. Therefore, the traffic master has a relatively strong fraudulent incentive to increase a quantity of advertisement response behaviors. How to identify an advertisement-related fraudulent behavior is always one of the most important problems in the online advertising system.

SUMMARY

Embodiments of this application provide a method and apparatus for preventing advertisement-related fraud, an electronic device, and a storage medium. By using the solutions in the embodiments of this application, an advertisement-related fraudulent behavior can be quickly and effectively identified, which can reduce the processing pressure of a server, and improve the identification efficiency and accuracy of the advertisement-related fraudulent behavior.

An embodiment of this application provides a method for preventing advertisement-related fraud, performed by a server. The method can include obtaining behavior source information of a current advertisement response behavior, where the behavior source information is information used for indicating a generation source of the current advertisement response behavior. The method can further include determining whether the behavior source information of the current advertisement response behavior is fraudulent behavior source information based on a similarity between the behavior source information of the current advertisement response behavior and known fraudulent behavior source information, and determining that the current advertisement response behavior is an advertisement-related fraudulent behavior when the behavior source information of the current advertisement response behavior is the fraudulent behavior source information.

An embodiment of this application further provides an apparatus for preventing advertisement-related fraud. The apparatus can include processing circuitry that is configured to obtain behavior source information of a current advertisement response behavior, where the behavior source information is information used for indicating a generation source of the current advertisement response behavior. The processing circuitry can be further configured to determine whether the behavior source information of the current advertisement response behavior is fraudulent behavior source information based on a similarity between the behavior source information of the current advertisement response behavior and known fraudulent behavior source information, and a determine that the current advertisement response behavior is an advertisement-related fraudulent behavior when the behavior source information of the current advertisement response behavior is the fraudulent behavior source information.

An embodiment of this application provides an electronic device, including a processor and a memory connected to the processor. The memory stores computer-readable instructions that, when loaded and executed by the processor, cause the processor to implement the foregoing method.

An embodiment of this application provides a non-volatile computer-readable storage medium storing computer-readable instructions that, when loaded and executed by a processor, cause the processor to implement the foregoing method.

BRIEF DESCRIPTION OF THE DRAWINGS

To describe the technical solutions in the embodiments of this application more clearly, the following briefly describes the accompanying drawings required for describing the exemplary embodiments of this application.

DESCRIPTION OF EMBODIMENTS

Figure 1A:
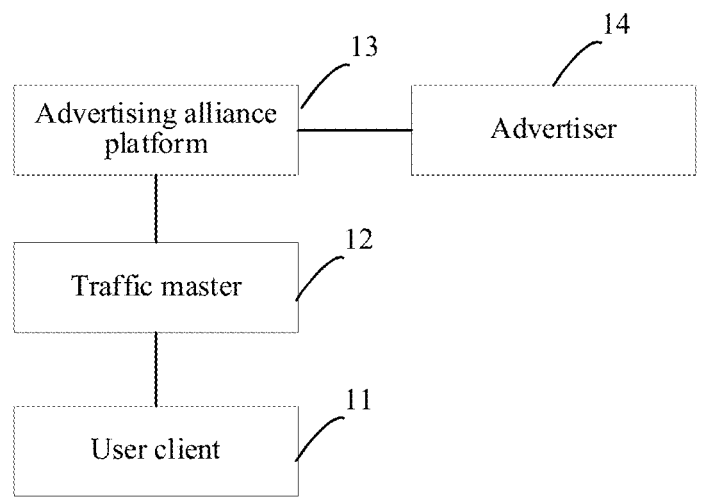
FIG. 1a is a schematic architectural diagram of an online advertising system to which an embodiment of this application is applicable.

To make the objectives, features, and advantages of this application clearer and more comprehensible, the following clearly and completely describes the technical solutions in the embodiments of this application with reference to the accompanying drawings in the embodiments of this application. Apparently, the embodiments described below are merely some rather than all of the embodiments of this application.

Exemplary embodiments of this application are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret this application and cannot be construed as a limitation to this application.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of and all combinations of one or more related listed items.

To better understand and describe the solutions in the embodiments of this application, the following briefly describes some technical terms involved in the embodiments of this application.

Bot: The bot is a malicious program transmitted by using a system vulnerability via file sharing, an email virus, and the like. After infected with the bot, information about an electronic device such as a mobile phone or a computer may be randomly used, and the electronic device is also manipulated to perform malicious behaviors such as advertisement-related fraud.

Zombie: It is a terminal infected with a bot, including a mobile phone, a PAD, a notebook computer, a personal computer, or another electronic device. The zombie is also referred to as a zombie computer, and may be remotely and randomly manipulated.

A response behavior for media recommendation information (for example, an advertisement response behavior) refers to a behavior responding to online media recommendation information, that is, an access trigger behavior of a user for the online media recommendation information. An example in which the media recommendation information is an advertisement is used. A specific form of the advertisement response behavior is decided through an advertisement presentation manner. For different advertisement presentation manners, the advertisement response behavior may also be different. The advertisement response behavior may include, but is not limited to behaviors such as an advertisement clicking behavior and an advertisement scanning behavior of a user. Specifically, for example, if an advertisement is presented to a user in a manner of clicking a link, the advertisement response behavior may be an advertisement clicking behavior. In another example, if an advertisement is presented to a user in a manner of an advertisement identification code (such as a two-dimensional code), the advertisement response behavior may be a scanning behavior of the user for the advertisement identification code. According to actual application requirements, the advertisement response behavior may be alternatively an advertisement sharing behavior of a user or another configured operation behavior performed by a user for an advertisement.

Malicious response behavior: In the links, such as media recommendation information exposure, media recommendation information response of a user, and media recommendation information effect, due to a malicious objective, the user may implement a behavior to increase the quantity of times of the exposure or the quantity of times of user response or improve the effect. The malicious behavior that is not true intention of the user is referred to as malicious response behavior.

Malicious response behavior identification: Checking is performed on the links, such as media recommendation information exposure, media recommendation information response of a user, and media recommendation information effect, to determine whether the exposure, the user response, the effect or the like is triggered through normal access on a user side or implemented through a malicious response means.

Media recommendation information placing party, for example, advertiser: It refers to a user or a service provider paying for placing advertisements. The advertiser hopes that all advertisement response behaviors paid by the advertiser are true and effective instead of being fraudulent clicking behaviors. For example, for a CPC advertisement mode, the advertiser hopes that all advertisement clicks (one type of the advertisement response behavior) paid by the advertiser are effective clicks of actual users instead of fraudulent clicks.

Traffic master: A traffic master is a carrier providing user traffic, which usually refers to media, a web page, or an APP, or may further include some influential official accounts. The traffic master may gain a portion of advertising profits. In the same advertisement exposure, a better actual effect of the advertisement, that is, more advertisement response behaviors of users (for example, a higher clicking rate), indicates more profits gained by the traffic master.

Mobile advertising alliance: It is usually a network advertisement organization and placing form in which small and medium-sized mobile media resources (traffic masters such as mobile phone APPs) are gathered to form an alliance, the alliance platform helps the advertiser perform advertisement placement, and monitors and performs statistics on advertisement placing data, and the advertiser pays advertising expenses to the traffic masters according to actual effects of network advertisements.

Advertisement-related fraud: In the links, such as advertisement exposure, user advertisement response, and advertisement effect, due to a malicious objective, a user may perform a behavior to increase the quantity of times of the advertisement exposure or the quantity of times of response to the advertisement or improve the advertisement effect. The malicious behavior that is not true intention of the user is referred to as advertisement-related fraud.

Preventing advertisement-related fraud: Checking is performed on the links, such as advertisement exposure, user advertisement response, and advertisement effect, to determine whether the advertisement exposure, the user advertisement response, the advertisement effect or the like is triggered through normal access on a user side or implemented through an advertisement-related fraudulent means.

Currently, there is a large quantity of bots on the network. User equipment such as a mobile phone or a computer of a user is infected with the bots and then becomes a zombie. The bots not only steal user information, but also manipulate the zombie to perform various malicious behaviors. For example, the bot manipulates the zombie to perform a malicious advertisement response behavior, such as clicking an advertisement in batches. In the mobile advertising alliance, which may be alternatively a third-party platform trusted by a traffic master and an advertiser, the traffic master and the alliance platform share the profits according to the advertisement effect, such as a quantity of advertisement clicks, generated in a client, such as an APP or a web page, of the publisher. A better advertisement effect, such as a larger quantity of clicks, indicates more advertisement revenue. Driven by such interest, some traffic masters obtain profits by using the bots by manipulating zombie users to perform malicious advertisement response behaviors. The advertisement response behaviors are false, and bring no effect or conversion to the advertiser, which severely affects the reputation of the platform. Therefore, such a fraudulent advertisement response behavior needs to be cracked down.

In some manners for identifying a fraudulent behavior, whether user equipment is infected with a bot is determined by analyzing underlying code, and the bot includes code of malicious advertisement response. However, in such a manner, it is difficult to obtain malicious samples, and a high permission is needed to scan the user equipment. In addition, the underlying code needs to be translated through a decompiling process into code that can be understood by a person, which has high costs of manual verification.

In view of the foregoing, to better satisfy actual application requirements, an embodiment of this application can provide a method for preventing advertisement-related fraud. By using this method, scanning of user equipment and a decompiling process do not need to be performed, which can accurately, conveniently, and quickly identify fraudulent behaviors in advertisement response behaviors, and improves the efficiency of preventing advertisement-related fraud.

The following describes the technical solutions of this application and how to resolve the foregoing technical problems according to the technical solutions of this application in detail by using specific embodiments. The following several specific embodiments may be combined with each other, and the same or similar concepts or processes may not be described repeatedly in some embodiments. The following describes the embodiments of this application with reference to the accompanying drawings.

FIG. 1a is a schematic structural diagram of an online advertising system to which a method for preventing advertisement-related fraud provided in an embodiment of this application is applicable. As shown in the figure, the online advertising system may mainly include user clients 11, traffic masters 12, an advertising alliance platform 13, and an advertiser 14. The advertising alliance platform 13 (which may be specifically a mobile advertising alliance platform) is a platform or an intermediary, and connects the advertiser 14 and the traffic masters 12, to place advertisements of the advertiser 14 to the traffic masters 12. A user may access advertisements by using the user clients 11 corresponding to the traffic masters 12. If the user access an advertisement published on the traffic master, that is, the user performs an advertisement response behavior for the advertisement, for example, clicks the advertisement, the traffic master 12 may gain a portion of advertisement profits from the advertiser 14 through the advertising alliance platform.

Figure 1B:
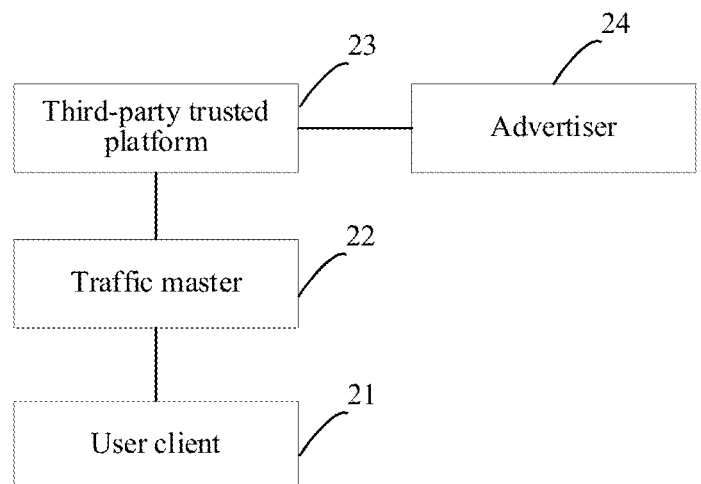
FIG. 1b is a schematic architectural diagram of another online advertising system to which an embodiment of this application is applicable.

FIG. 1b is a schematic structural diagram of another online advertising system to which a method for preventing advertisement-related fraud provided in an embodiment of this application is applicable. As shown in the figure, the system may mainly include user clients 21, traffic masters 22, a third-party trusted platform 23, and an advertiser 24. It may be learned by comparing FIG. 1a with FIG. 1b that, the third-party trusted platform 23 may play a role of the advertising alliance platform 13 shown in FIG. Ta. The platform is an intermediary trusted by the traffic masters 22 and the advertiser 24, and may place advertisements of the advertiser 24 to the traffic masters 22. A user may access advertisements by using the user clients 21 corresponding to the traffic masters 22. If the user access an advertisement published on the traffic master, the traffic master 22 may gain a portion of advertisement profits from the advertiser 24 through the third-party trusted platform 23.

For a CPC advertisement mode, advertisement response behaviors of users are advertisement clicking behaviors of the users, and the advertiser hopes that all advertisement clicks paid by the advertiser are effective clicks of actual users instead of fraudulent clicks. Therefore, after receiving advertisement clicks of users on clients of the traffic masters, the advertising alliance platform 13 shown in FIG. 1a or the third-party trusted platform 23 shown in FIG. Tb needs to first determine whether advertisement clicking behaviors are fraudulent clicking behaviors. If the advertisement clicking behaviors are the fraudulent clicking behaviors, the advertiser does not need to pay fees to the traffic masters. If the advertisement clicking behaviors are not the fraudulent clicking behaviors, the advertiser needs to pay fees to the traffic masters. It can be seen that for the online advertising systems shown in FIG. 1a and FIG. Tb, the method for preventing advertisement-related fraud in the embodiments of this application may be performed by the advertising alliance platform 13 or the third-party trusted platform 23.

Two system architectures shown in FIG. 1a and FIG. Tb are only two examples of an architecture of a system to which the solution in the embodiments of this application is applicable, and are not intended to limit application scenarios of the solution in the embodiments of this application. In actual applications, the solution in the embodiments of this application may be performed by any platform, which may be specifically a server or another electronic device, that is authorized by the advertiser and the traffic masters and can identify an advertisement-related fraudulent behavior.

Figure 2:
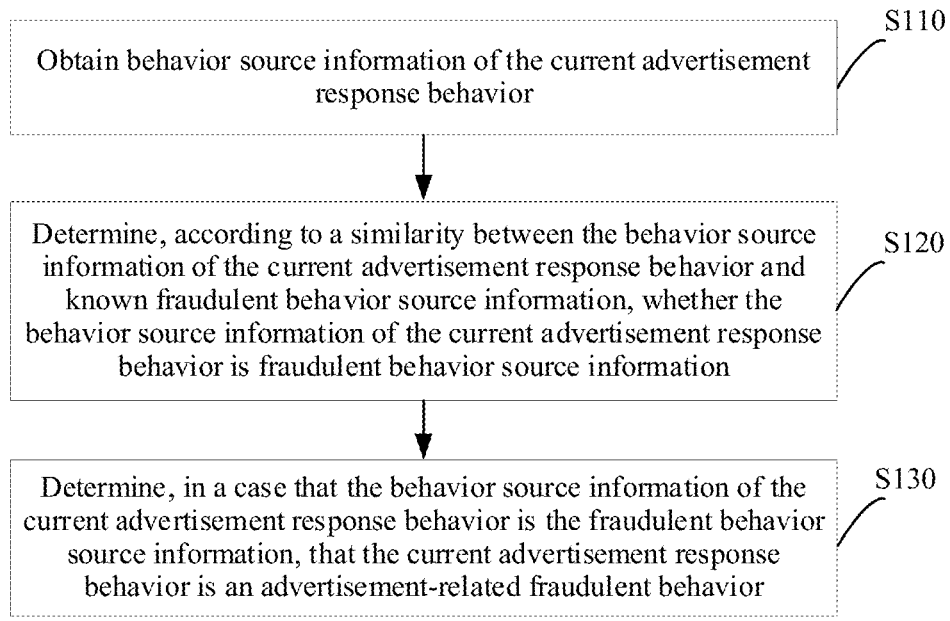
FIG. 2 is a schematic flowchart of a method for preventing advertisement-related fraud according to an embodiment of this application.

FIG. 2 is a schematic flowchart of a method for preventing advertisement-related fraud according to this application. The method may be performed by a server. As shown in FIG. 2, the method may include the following.

In step S110, the method can obtain behavior source information of a current advertisement response behavior, the behavior source information being used for indicating a generation source of the current advertisement response behavior. It may be learned from the foregoing description that an advertisement response behavior of a user in the embodiments of this application may include, but is not limited to, an advertisement clicking behavior, an advertisement scanning behavior, an advertisement sharing behavior, and a response behavior of another user for an online advertisement.

For any advertisement response behavior, behavior source information of the advertisement response behavior refers to information indicating a generation source of the advertisement response behavior, and may include information used for indicating a place where the advertisement response behavior is located and a user generating the behavior, that is, information used for identifying a generation place of the advertisement response behavior and a user generating the advertisement response behavior. For a current advertisement response behavior, behavior source information of the current advertisement response behavior is information used for indicating a generation source of the current advertisement response behavior.

Specifically, the behavior source information of the advertisement response behavior may include, but is not limited to, at least one of a user identifier of a user generating the advertisement response behavior and an identifier of an advertisement publisher of an advertisement corresponding to the advertisement response behavior. The advertisement publisher of the advertisement corresponding to the advertisement response behavior may include at least one of a traffic master (such as an APP) of the advertisement corresponding to the advertisement response behavior and a developer corresponding to the traffic master of the advertisement corresponding to the advertisement response behavior. For example, for an advertisement clicking behavior of a user on an APP, the APP is a traffic master of an advertisement corresponding to the advertisement clicking behavior, that is, the advertisement clicked by the user is published on the APP, and a developer of the APP is a developer of the advertisement corresponding to the advertisement clicking behavior. For the current advertisement response behavior, the behavior source information of the current advertisement response behavior may include at least one of the following: an identifier of a current user generating the current advertisement response behavior and an identifier of an advertisement publisher of an advertisement corresponding to the current advertisement response behavior.

Correspondingly, the advertisement publisher of the advertisement corresponding to the current advertisement response behavior may be at least one of a traffic master of the advertisement corresponding to the current advertisement response behavior and a developer corresponding to the traffic master of the advertisement corresponding to the current advertisement response behavior.

In some embodiments of this application, the identifier of the current user may include, but is not limited to, at least one of a model and an operating system version of a device used by the user (that is, a device used by the user when performing the advertisement response behavior), an IP address corresponding to the device used by the user, and login account information used by the user.

The login account information used by the user refers to login account information used by the user for logging in to a corresponding client when the user performs the advertisement response behavior on the client corresponding to the traffic master. For example, a user clicks on an advertisement once on a website or an APP, the login account information is an account used by the user for logging in to the website, or an account used for logging in to the APP, for example, a WeChat account used by the user when logging in to the WeChat.

In an example, a user clicks on an advertisement on a client of an official account of WeChat, the traffic master in this example, behavior source information of the advertisement clicking behavior is clicking source information, and may include an identifier of the official account of WeChat, a device model of a terminal device used by the user, and an operating system version of the device.

In step S120 the method can determine, according to a similarity between the behavior source information of the current advertisement response behavior and known fraudulent behavior source information, whether the behavior source information of the current advertisement response behavior is fraudulent behavior source information. The known fraudulent behavior source information may be obtained based on behavior source information of historical advertisement response behaviors of users that is obtained through statistics, or may be obtained based on report information of users.

In step S130, the method can determine, in a case that the behavior source information of the current advertisement response behavior is the fraudulent behavior source information, that the current advertisement response behavior is an advertisement-related fraudulent behavior. In actual applications, most advertisement-related fraudulent behaviors, that is, fraudulent advertisement response behaviors, are generated by zombies infected with bots. When the zombie is infected with the bot, a security vulnerability used is usually exists on a specific type of terminal device, for example, a terminal device with a specific operating system version, or a specific device model (such as a phone model), or may be terminal devices with a similar type of IP address, or login devices of some accounts. Therefore, terminal devices where the fraudulent advertisement response behaviors are generated usually have a specific similarity.

In addition, the fraudulent advertisement response behaviors usually gather on some traffic masters, such as some APPs or some websites, or developers corresponding to the traffic masters. That is, traffic masters and developers of advertisements corresponding to fraudulent advertisement clicks also have a specific similarity. For example, zombie users have all clicked on advertisements on a few APPs in the past month.

It can be seen that, all generation sources of the fraudulent advertisement response behaviors have a similarity. Therefore, whether an advertisement response behavior is a fraudulent behavior can be determined based on behavior source information of the advertisement response behavior, and in actual applications, the behavior source information of the advertisement response behavior is information easy to be obtained. For example, for the advertising alliance platform 13 shown in FIG. 1*a* or the third-party trusted platform 23 shown in FIG. 1*b*, both the advertising alliance platform 13 and the third-party trusted platform 23 are platforms trusted by an advertiser and traffic masters, and to ensure the interest of the advertiser, all related information (including clicking source information) of advertisement response behaviors generated on the traffic masters need to be reported to the platforms. Therefore, behavior source information of advertisement response behaviors of users is easy to be obtained. It is easy and convenient to implement the solution in the embodiments of this application, and advertisement-related fraudulent behaviors can be effectively identified, which better satisfies actual application requirements.

In conclusion, in the method for preventing advertisement-related fraud provided in the embodiments of this application, whether an advertisement response behavior of a user is a fraudulent behavior may be conveniently and quickly identified based on behavior source information of the advertisement response behavior. When the solution is implemented in actual applications, costs are low, the processing pressure of a server can be reduced, and actual requirements of preventing advertisement-related fraud are better satisfied, improving the efficiency and accuracy of preventing fraud.

It may be understood that, the solution in the embodiments of this application is applicable to identification of fraudulent advertisement response behaviors, that is, advertisement response behaviors of zombie users, obtained by controlling zombies to perform malicious advertisement response, and also applicable to identification of fraudulent advertisement response behaviors of other types of users, such as users manually performing malicious advertisement response behaviors.

In some embodiments of this application, step S120 may include determining, in a case that at least one piece of information in the behavior source information of the current advertisement response behavior exists in a blacklist database, that the behavior source information of the current advertisement response behavior is the fraudulent behavior source information, the blacklist database storing the known fraudulent behavior source information, or inputting the behavior source information of the current advertisement response behavior to a first fraud identification model, and determining, according to an output of the first fraud identification model, whether the behavior source information of the current advertisement response behavior is the fraudulent behavior source information, the first fraud identification model being a model that is trained based on the known fraudulent behavior source information and used for identifying whether behavior source information is fraudulent behavior source information.

Specifically, for the solution in which whether the behavior source information of the current advertisement response behavior is the fraudulent behavior source information is determined by using a first fraud identification model, because the first fraud identification model is a model that is trained based on the known fraudulent behavior source information and can identify whether behavior source information is fraudulent behavior source information, an output of the first fraud identification model indicates a similarity between the behavior source information of the current advertisement response behavior and the known fraudulent behavior source information. If an output of the first fraud identification model indicates that the behavior source information of the current advertisement response behavior is fraudulent behavior source information, it indicates that the behavior source information of the current advertisement response behavior and the known fraudulent behavior source information are similar, and thus the behavior source information of the current advertisement response behavior may be determined as the fraudulent behavior source information. Conversely, if an output of the model indicates that the behavior source information of the current advertisement response behavior is not fraudulent behavior source information, it indicates that the behavior source information of the current advertisement response behavior and the known fraudulent behavior source information are not similar. Therefore, whether the behavior source information of the current advertisement response behavior is the fraudulent behavior source information may be directly determined according to the output of the model.

Specifically, the first fraud identification model may be obtained by training a deep learning model based on sample data. Inputs of the model are behavior source information of advertisement response behaviors, and outputs may be used for indicating whether the behavior source information of the advertisement response behaviors is fraudulent behavior source information.

For the solution in which whether the behavior source information of the current advertisement response behavior is the fraudulent behavior source information is determined according to the blacklist database, the blacklist database stores the known fraudulent behavior source information. Therefore, in this solution, whether at least one piece of information in the behavior source information of the current advertisement response behavior exists in the blacklist database indicates a similarity between the behavior source information of the current advertisement response behavior and the known fraudulent behavior source information. If at least one piece of information in the behavior source information of the current advertisement response behavior is information in the known fraudulent behavior source information stored in the blacklist database, it indicates that the behavior source information of the current advertisement response behavior and the known fraudulent behavior source information are similar, and thus it may be determined that the behavior source information of the current advertisement response behavior is the fraudulent behavior source information.

It may be understood that to determine, according to the blacklist database, whether behavior source information of advertisement response behaviors is fraudulent behavior source information, behavior source information of a current advertisement response behavior to be identified includes at least one type of information corresponding to information in the blacklist database. The information in the blacklist database may be obtained through a plurality of different paths, for example, may be obtained based on user report information, or may be obtained based on statistical data (for example, behavior record information of historical advertisement response behaviors of users). In some embodiments of this application, the blacklist database may include at least one of a user identifier blacklist and a publisher identifier blacklist. It may be learned from the foregoing description that the publisher identifier blacklist may include at least one of a traffic master identifier blacklist and a developer identifier blacklist.

It may be learned from the foregoing description that at least one piece of information in the behavior source information of the current advertisement response behavior is information corresponding to information in the blacklist database. Specifically, if the blacklist database only includes the user identifier blacklist, the behavior source information of the current advertisement response behavior obtained in S110 at least includes one user identifier of a current user corresponding to user identifiers in the user identifier blacklist. For example, if the user identifier blacklist includes a device model blacklist and an operating system version blacklist, the behavior source information needs to include at least one of a device model and an operating system version of a terminal device used by the current user. Similarly, if the blacklist database includes at least two of the user identifier blacklist, the traffic master identifier blacklist, and the developer identifier blacklist, the behavior source information of the current advertisement response behavior includes at least one of a user identifier corresponding to the current advertisement response behavior, an identifier of a traffic master of an advertisement corresponding to the advertisement response behavior, and an identifier of a developer corresponding to the traffic master of the advertisement corresponding to the advertisement response behavior.

It can be seen that in actual applications, if an advertisement-related fraudulent behavior is identified based on the blacklist database, behavior source information of an advertisement response behavior that needs to be obtained during identification of the advertisement-related fraudulent behavior may be determined according to a type of information stored in the blacklist database. For example, the blacklist database stores a device model blacklist, an operating system version blacklist, and a traffic master identifier blacklist, behavior source information that needs to be obtained may be at least one of a device model of a terminal device used by a current user and an operating system version of the device, and an identifier of a traffic master of an advertisement corresponding to an advertisement response behavior.

In actual applications, when determining of an advertisement-related fraudulent behavior is performed based on the blacklist database, different manners for determining whether an advertisement response behavior of a current user is an advertisement-related fraudulent behavior may be configured according to actual application requirements. That is, if at least one of the two conditions: the current user is a fraudulent user and the current advertisement publisher is a fraudulent publisher is satisfied, a specific implementation of determining the current advertisement response behavior is the advertisement-related fraudulent behavior in S130 may be configured as required.

Certainly, for different configured implementations, the accuracy of identifying an advertisement-related fraudulent behavior is also different. For example, in some embodiments, a plurality of types of information blacklists, for example, a device model blacklist, an operating system version blacklist, an IP address blacklist, and a traffic master identifier blacklist, may be configured in the blacklist database as many as possible. When whether an advertisement response behavior is an advertisement-related fraudulent behavior is determined, behavior source information of the advertisement response behavior corresponding to types of information in the blacklist database may be obtained as many as possible. For example, the behavior source information may include a device identifier of a terminal device used by a current user, an operating system version of the device, an IP address corresponding to the device, and a traffic master of an advertisement corresponding to the advertisement response behavior. In this manner, a specific manner of determining whether an advertisement response behavior of a current user is an advertisement-related fraudulent behavior may be selected according to actual requirements. For example, if the identification accuracy needs to be high to a maximum extent, a solution in which only when all four types of information in the source information exist in the blacklist database, the current advertisement response behavior of the current user is determined as the advertisement-related fraudulent behavior may be selected. If the identification accuracy and an effect of anti-fraud identification needs to be balanced, a solution in which when at least two or three of the four types of information exist in the blacklist database, the advertisement response behavior of the current user is determined as the advertisement-related fraudulent behavior may be selected. If a possible advertisement-related fraudulent behavior needs to be selected, a solution in which provided that at least one of the four types of information exists in the blacklist database, the current advertisement response behavior is determined as the advertisement-related fraudulent behavior may be selected.

In some embodiments of this application, the method may further include adding, in a case that the behavior source information of the current advertisement response behavior is the fraudulent behavior source information, and at least one piece of information in the behavior source information of the current advertisement response behavior does not exist in the blacklist database, the information that does not exist in the blacklist database, in the behavior source information of the current advertisement response behavior to the blacklist database.

Specifically, when it is determined that the current advertisement response behavior is the advertisement-related fraudulent behavior, information that does not exist in the blacklist database, in the behavior source information of the current advertisement response behavior may be added to the blacklist database, to perfect information in the blacklist database, thereby implementing update of the blacklist database, and providing more data for the subsequent identification of advertisement-related fraudulent response information. For example, when the behavior source information of the current advertisement response behavior includes an identifier of the current user and an identifier of an advertisement publisher of an advertisement corresponding to the current advertisement response behavior, if the behavior source information of the current advertisement response behavior is determined as the fraudulent behavior source information, but the identifier of the current user does not exist in the blacklist database, the identifier of the current user may be added to the blacklist database.

In some embodiments of this application, the blacklist database may be obtained by obtaining behavior record information of historical advertisement response behaviors of advertisement response users, the behavior record information of the historical advertisement response behaviors including behavior source information of the historical advertisement response behaviors, and obtaining the blacklist database by using a second fraud identification model based on the behavior record information of the historical advertisement response behaviors, the second fraud identification model being a model that is trained based on behavior record information of advertisement response behaviors and used for identifying fraudulent behavior source information.

Specifically, in the embodiments of this application, inputs of the second fraud identification model may be behavior record information of advertisement response behaviors of users, for example, the behavior record information of the historical advertisement response behaviors, or may be information obtained based on the behavior record information of the advertisement response behaviors of the users, for example, information obtained after corresponding processing is performed on the behavior record information of the response behaviors of the users according to a pre-configured data pre-processing policy. Outputs of the second fraud identification model are information corresponding to information in the blacklist database. For example, when the behavior record information of the advertisement response behaviors includes user identifiers of the advertisement response users, outputs of the second fraud identification model may be user type tags used for indicating whether a user is a fraudulent user or a normal user. Correspondingly, in this case, the blacklist database may include the user identifier blacklist, so that user identifiers corresponding to fraudulent users may be added to the blacklist database based on the user type tags outputted by the model. In this case, identifiers of fraudulent publishers may be further determined based on the identified identifiers of the fraudulent users and identifiers of advertisement publishers of advertisements corresponding to advertisement response behaviors of the fraudulent users, and the identifiers of the fraudulent publishers may be also added to the blacklist database. In another example, when the behavior record information of the advertisement response behaviors includes identifiers of advertisement publishers of advertisements corresponding to the advertisement response behaviors, outputs of the second fraud identification model may be tags used for indicating whether an advertisement publisher is a fraudulent publisher. Correspondingly, in this case, the blacklist database may include the advertisement publisher identifier blacklist.

The first fraud identification model and the second fraud identification model may be models having the same function, or may be models having different functions. Specifically, for example, if the inputs of the second fraud identification model are behavior record information of advertisement response behaviors, and the behavior record information of users and the behavior source information are the same, the first fraud identification model and the second fraud identification model may be the same.

For the second fraud identification model, in some embodiments, the model may be directly deployed in an execution body of the method in the embodiments of this application, for example, deployed in a server of the advertising alliance platform. After the behavior source information of the current advertisement response behavior is obtained, the obtained behavior source information may be directly inputted to the fraud identification model, and whether the current advertisement response behavior of the current user is an advertisement-related fraudulent behavior is determined based on an output of the mode. In another manner, the model may be alternatively applied to another electronic device, and the another electronic device obtains data in the blacklist database by using the identification model based on the behavior record information of the historical advertisement response behaviors of the advertisement response users. The another electronic device sends the obtained data in the blacklist database to the execution body of the method in the embodiments of this application, so that the execution body of the method in the embodiments of this application may determine whether the current advertisement response behavior of the current user is an advertisement-related fraudulent behavior based on the data in the blacklist database.

In conclusion, when whether the current advertisement response behavior of the current user is an advertisement-related fraudulent behavior is determined based on the blacklist database, the method for preventing advertisement-related fraud in the embodiments of this application may be divided into two parts for implementing. The first part is to obtain data in the blacklist database by using the second fraud identification model, and the second part is determining of an advertisement-related fraudulent behavior. For the first part, the second fraud identification model may be deployed in an execution body for performing the method in the embodiments of this application, or may be set in another electronic device. The another electronic device performs the manner of obtaining the blacklist database, and sends the obtained blacklist database to the execution body of the method in the embodiments of this application. The execution body of the method in the embodiments of this application determines whether the current advertisement response behavior is an advertisement-related fraudulent behavior based on the blacklist database.

In addition, it may be clear for a person skilled in the art that, in actual applications, the data in the blacklist database may be obtained by using outputs of the second fraud identification model based on the behavior record information of the historical advertisement response behaviors of the advertisement response users. Therefore, statistics may be performed, at a specific time interval, on behavior record information of historical advertisement response behaviors of advertisement response users within a corresponding time period, data in the blacklist database is obtained by using the second fraud identification model based on data obtained through statistics, and the blacklist database used online may be updated and perfected according to data in the blacklist database corresponding to each latest time period.

In some embodiments of this application, the second fraud identification model is obtained by obtaining training sample data, the training sample data including behavior record information of advertisement response behaviors of training sample users, and the training sample users including normal sample users and fraudulent sample users, and using behavior record information of advertisement response behaviors of the fraudulent sample users as positive samples, using behavior record information of advertisement response behaviors of the normal sample users as negative samples, training an initial deep learning model based on the training sample data to obtain a deep learning model that satisfies a training end condition, and using the deep learning model that satisfies the training end condition as the second fraud identification model.

The training end condition is a condition of ending model training, and may be configured according to application requirements. For example, the condition may refer to that a loss function of the model is in a convergence state, or may be that the identification accuracy of the model is greater than a setting value, or a recall rate of the model is greater than a setting value. Specifically, the training sample data may be inputted to an initial deep learning model, and model parameters are constantly updated and optimized through iterative training. When a training end condition is satisfied, training of the deep learning model may be ended, and the deep learning model with updated parameters is used as the second fraud identification model.

In actual applications, when an initial deep learning model is trained to obtain the fraud identification model, a test data set may be further configured, to verify sample data, and the deep learning model after the iterative training is tested by using the test data set until a training result satisfies a training end condition.

Based on the second fraud identification model in the embodiments of this application, behavior record information of historical advertisement response behaviors of advertisement response users may be obtained, processing is performed by using the model based on the obtained behavior record information of the historical advertisement response behaviors, and blacklist data corresponding to the behavior record information of the advertisement response behaviors may be determined based on outputs of the model.

In some embodiments, when the model is trained, outputs of the model may be user type tags, so that information corresponding to fraudulent users (such as user identifiers and identifiers of traffic masters of advertisements corresponding to advertisement response behaviors) that corresponds to information in the blacklist database may be added to the blacklist database based on the tags. In this case, because determining a user type is a binary classification problem, in this manner, output results of the model may be two-dimensional, for example, may be probabilities of user types, that is, a probability that a user is a fraudulent user and a probability that the user is a normal user. Therefore, the two probabilities are user type tags, and identify whether the user is a fraudulent user or a normal user. For example, when the probability that a user is a fraudulent user exceeds 50%, the user may be considered as a fraudulent user.

It may be learned from the foregoing description that behavior record information of advertisement response behaviors includes behavior source information of the advertisement response behaviors. Therefore, the behavior record information of the advertisement response behaviors of the training sample users include behavior source information of the advertisement response behaviors of the training sample users, that is, may include at least one of user identifiers of the training sample users and identifiers of advertisement publishers of advertisements corresponding to the advertisement response behaviors of the training sample users. Similarly, the user identifiers of the training sample users may include at least one of models of devices used by the training sample users, operating system versions of the devices, IP addresses corresponding to the devices, and login account information used by the users.

Certainly, in actual applications, when the model is trained, more types of data that is used can indicate a better model training result and higher output accuracy of the model during application of the model.

It may be understood that, input information of the model in a model training stage corresponds to that of the model in a model application stage. That is, the behavior record information of the advertisement response behaviors of the training sample users and the behavior record information of the historical advertisement response behaviors of the advertisement response users that is used when the blacklist database is obtained based on the trained model are matched, and a difference only lies in that users corresponding to the behavior record information may be different.

In some embodiments of this application, in a case that the behavior record information of the advertisement response behaviors of the training sample users includes identifiers of advertisement publishers of advertisements corresponding to the advertisement response behaviors of the training sample users, the training an initial deep learning model based on the training sample data includes determining publisher information of the training sample users according to the identifiers of the advertisement publishers in the behavior record information of the advertisement response behaviors of the training sample users. The publisher information including at least one piece of the following information: publisher distribution information of the advertisement publishers of the advertisements corresponding to the advertisement response behaviors and a proportion of advertisement response behaviors on at least one type of advertisement publishers to the advertisement response behaviors, an advertisement publisher type including a fraudulent publisher, a pending publisher, and a normal publisher. Further, training sample data can further include training the initial deep learning model by using the publisher information of the training sample users as inputs of the initial deep learning model.

That is, when the initial deep learning model is trained, corresponding pre-processing may be first performed on the behavior record information of the advertisement response behaviors of the training sample users, and data obtained through pre-processing is used as inputs of the initial deep learning model, to train the model. By training the model based on the pre-processed data, the accuracy of output data of the trained model may be further improved.

It may be understood that, in actual applications, data pre-processing may be alternatively completed by the model. That is, a data pre-processing module is configured before an input layer of the model. Input data of the data pre-processing module is advertisement clicking record information of users, and outputs are data on which corresponding pre-processing is performed. The outputs of the data pre-processing module are input data of the input layer of the model.

It may be learned from the foregoing description that the advertisement publishers may be at least one of traffic masters and developers corresponding to the traffic masters. Correspondingly, when the advertisement publishers are the traffic masters, the publisher distribution information refers to traffic master distribution information, and a proportion of advertisement response behaviors on at least one type of advertisement publishers to the advertisement response behaviors refers to a proportion of advertisement response behaviors on at least one type of traffic masters to the advertisement response behaviors. Similarly, when the advertisement publishers are the developers corresponding to the traffic masters, the publisher distribution information refers to developer distribution information, and a proportion of advertisement response behaviors on at least one type of advertisement publishers to the advertisement response behaviors refers to a proportion of advertisement response behaviors on at least one type of developers to the advertisement response behaviors.

Specifically, the traffic master distribution information of the traffic masters of the advertisements corresponding to the advertisement response behaviors, that is, information used for identifying the distribution of advertisement response behaviors of each user on the traffic masters, may be, for example, a quantity of advertisement response behaviors of the user on each traffic master, or may be a proportion of advertisement response behaviors corresponding to each traffic master, or may be a quantity of users performing advertisement response behaviors on each traffic master pair, that is, two traffic masters.

Similarly, the developer distribution information corresponding to the advertisement response behaviors is information used for identifying the distribution of advertisement response behaviors of each user on the developers, and may be specifically a quantity of advertisement response behaviors corresponding to each developer, or may be a proportion of advertisement response behaviors corresponding to each developer. For example, an example in which the advertisement response behaviors are advertisement clicking behaviors is used. A user has 10 advertisement clicks in total, where a quantity of clicks on APP 1 is 2, a quantity of clicks on APP 2 is 3, and a quantity of clicks on APP 2 is 5. A developer corresponding to APP 1 is a developer 1, and a developer corresponding to APP 2 is a developer 2. Therefore, developer distribution information corresponding to the advertisement clicks of the user may be denoted as (developer 1: 2, developer 2: 3, developer 2: 5), and may be alternatively denoted as (developer 1: 1/5, developer 2: 3/10, developer 2: 1/2).

Publisher types of the advertisement publishers may be specifically determined according to quantities of advertisement response behaviors of the fraudulent sample users on the advertisement publishers in initial sample users, specifically described below. For example, for traffic master types of the traffic masters, the traffic master types of the traffic masters may be specifically determined according to quantities of advertisement clicks of the fraudulent sample users on the traffic masters included in the initial sample data, specifically described below. Specifically, a traffic master having a proportion of advertisement response behaviors on the traffic master to advertisement response behaviors of the fraudulent sample users greater than a first setting value may be determined as a fraudulent traffic master, a traffic master having a proportion of advertisement response behaviors on the traffic master to the advertisement response behaviors of the fraudulent sample users less than a second setting value may be determined as a normal traffic master, and a traffic master having a proportion of advertisement response behaviors on the traffic master to the advertisement response behaviors of the fraudulent sample users that is not greater than the first setting value and not less than the second setting value may be determined as a pending traffic master. The first setting value is greater than the second setting value.

A clicking proportion of the advertisement response behaviors of the fraudulent sample users on an advertisement publisher (such as a traffic master) may refer to a proportion of a quantity of advertisement clicking response behaviors of the fraudulent sample users on the advertisement publisher to a quantity of advertisement response behaviors of all the initial sample users on the advertisement publisher. For example, by using advertisement clicking behaviors as an example, for an APP, if a quantity of advertisement clicks of the fraudulent sample users on the APP is 10, and a quantity of clicks of all the initial sample users including the fraudulent sample users on the APP is 30, a clicking proportion of advertisement clicks of the fraudulent sample users on the APP is 1/3.

It may be learned from the foregoing description that the advertisement-related fraudulent behaviors usually gather on some traffic masters or developers corresponding to some traffic masters, and any one of the traffic master distribution information, proportions of advertisement response behaviors on various types of traffic masters to the advertisement response behaviors, the developer distribution information, and proportions of advertisement response behaviors on various types of publishers to the advertisement response behaviors can indicate advertisement response behaviors of different types of users (the fraudulent sample users and the normal sample users) on the traffic masters or the developers to a certain extent. That is, advertisement response behaviors of users can be reflected by using any one of the traffic master distribution information, proportions of advertisement response behaviors on various types of traffic masters to the advertisement response behaviors, the developer distribution information, and proportions of advertisement response behaviors on various types of publishers to the advertisement response behaviors. Therefore, iterative training may be performed on the initial deep learning model based on at least one piece of information in these types of information of the training sample users, to enable the model to learn advertisement response behavior features of fraudulent users and advertisement response behavior features of normal users, so that when the model obtained through training is applied, relatively accurate blacklist information can be obtained based on outputs of the model.

It may be learned from the foregoing description that the second fraud identification model in the embodiments of this application may be separately deployed in a server. The server may process the behavior record information of the historical advertisement response behaviors of the advertisement response users by using the identification model and determine fraudulent users in the advertisement response users based on outputs of the model, and may further determine fraudulent publishers in the advertisement publishers included in the behavior record information of the historical advertisement response behaviors based on the outputs of the model.

In some embodiments of this application, in a case that the behavior record information of the advertisement response behaviors of the training sample users includes identifiers of the training sample users, the training an initial deep learning model based on the training sample data includes training the initial deep learning model by using the identifiers of the training sample users as inputs of the initial deep learning model.

That is, the model may be trained by directly using the identifiers of the training sample users as inputs of the initial deep learning model. Correspondingly, in a case that the behavior record information of the advertisement response behaviors of the training sample users includes identifiers of the training sample users and identifiers of advertisement publishers of advertisements corresponding to the advertisement response behaviors of the training sample users, the initial deep learning model may be trained according to the identifiers of the training sample users and publisher information of the training sample users.

In some embodiments of this application, the obtaining training sample data includes obtaining initial sample data, the initial sample data including the behavior record information of the advertisement response behaviors of the fraudulent sample users and behavior record information of advertisement response behaviors of pending users. The training sample data can further include determining, according to quantities of advertisement response behaviors of the fraudulent sample users on advertisement publishers in the initial sample data, publisher types of the advertisement publishers included in the initial sample data, using users, in the pending users, that have a proportion, of advertisement response behaviors on normal publishers to advertisement response behaviors of the users, satisfying a setting condition as the normal sample users, and using the behavior record information of the advertisement response behaviors of the fraudulent sample users and the behavior record information of the advertisement response behaviors of the normal sample users as the training sample data.

In actual applications, the training sample data may be obtained based on initial sample data. The initial sample data includes the behavior record information of the advertisement response behaviors of the fraudulent sample users (these users are sample users that have been determined as fraudulent users), and other sample data, that is, the behavior record information of the advertisement response behaviors of the pending users, may be undetermined.

Specifically, the fraudulent sample users may be few zombie users confirmed by a person or obtained in another manner. The known zombie users are used as seeded zombie users, and publisher types of advertisement publishers may be determined based on quantities of advertisement response behaviors of the seeded zombie users on the advertisement publishers included in the initial sample data. Specifically, the advertisement publishers may be classified as normal publishers, suspicious publishers (that is, pending publishers), and fraudulent publishers based on proportions of advertisement response behaviors of the seeded zombie users on the advertisement publishers, such as APPs.

After various types of advertisement publishers are determined, users, in the pending users, that have a proportion, of advertisement response behaviors on normal publishers to advertisement response behaviors of the users, satisfying a setting condition as the normal sample users. The initial deep learning model is trained by using the behavior record information of the advertisement response behaviors of the normal sample users as negative samples of the training sample data, and using behavior record information of the advertisement response behaviors of the seeded zombie users as positive samples of the training sample data, to obtain the second fraud identification model.

The setting condition used for determining the normal sample users may be configured as required. For example, in some implementations, the setting condition may be that a proportion of advertisement response behaviors is greater than a setting threshold. Therefore, for a pending user, when a proportion of advertisement response behaviors on normal publishers to advertisement response behaviors of the user is greater than the setting threshold, the pending user may be used as a normal sample user, and behavior record information of the advertisement response behaviors of the user may be used as negative samples during training. In another implementation, when the initial deep learning model is trained, normal sample users having the same quantity as the seeded zombie users may be selected. For example, if a quantity of seeded zombie users is n, the setting condition may be first n maximum proportions of advertisement response behaviors. In this case, pending users corresponding to first n maximum proportions of advertisement response behaviors in proportions of advertisement response behaviors on normal advertisers to advertisement response behaviors corresponding to all the pending users are used as normal sample users.

In some embodiments, the normal sample users may be determined from the pending users based on a proportion of advertisement response behaviors on normal traffic masters to advertisement response behaviors of the pending users. Specifically, traffic master types of traffic masters included in the initial sample data may be determined according to quantities of advertisement response behaviors of the fraudulent sample users on the traffic masters in the initial sample data, and users, in the pending users, that have a proportion, of advertisement response behaviors on normal traffic masters to advertisement response behaviors of the users, satisfying a setting condition are determined as the normal sample users.

In some embodiments of this application, in a case that the behavior record information of the advertisement response behaviors of the training sample users includes identifiers of the training sample users, outputs of the second fraud identification model are user type tags, the user type tags being used for indicating whether a user is a fraudulent user or a normal user. Correspondingly, in a case that the blacklist database includes the user identifier blacklist, the obtaining the blacklist database by using a second fraud identification model may specifically include determining fraudulent users in the advertisement response users based on the outputs of the second fraud identification model, and obtaining the user identifier blacklist based on user identifiers of the fraudulent users in the advertisement response users.

When the blacklist database includes the advertisement publisher identifier blacklist, the obtaining the blacklist database by using a second fraud identification model may specifically include determining fraudulent users in the advertisement response users based on the outputs of the second fraud identification model, determining, according to quantities of advertisement response behaviors of the fraudulent users in the advertisement response users on advertisement publishers included in the behavior record information of the historical advertisement response behaviors, publisher types of the advertisement publishers included in the behavior record information of the historical advertisement response behaviors, and obtaining the advertisement publisher identifier blacklist based on identifiers of fraudulent publishers included in the behavior record information of the historical advertisement response behaviors.

Specifically, in a case that the outputs of the second fraud identification model are user type tags, for example, being specifically a probability that a user is a normal user and a probability that a user is a fraudulent user, information that corresponds to corresponding fraudulent users needs to be added to the blacklist database based on the outputs of the model. For example, if the blacklist database includes a user identifier blacklist, user identifiers of the fraudulent users identified by the model are added to the blacklist database. If the advertisement publisher identifier blacklist in the blacklist database includes a traffic master identifier blacklist, traffic master types of traffic masters may be determined based on the fraudulent users identified by the model, and identifiers of fraudulent traffic masters are added to the blacklist database. If the advertisement publisher identifier blacklist in the blacklist database includes a developer identifier blacklist, developer types of developers may be determined based on the fraudulent users identified by the model, and identifiers of fraudulent developers are added to the blacklist database.

When data in the blacklist database is obtained based on the behavior record information of the historical advertisement response behaviors, if an input of the second fraud identification model includes a proportion of advertisement response behaviors on various types of advertisement publishers (such as various types of traffic masters) to advertisement response behaviors, types of the advertisement publishers included in the behavior record information of the historical advertisement response behaviors may be classified according to quantities of clicks of the known fraudulent users on the advertisement publishers included in the historical advertisement response behaviors. After the fraudulent users in the advertisement response users corresponding to the behavior record information of the historical advertisement response behaviors are determined based on the outputs of the model, types of the advertisement publishers included in the behavior record information of the historical advertisement response behaviors may be re-determined based on the fraudulent users identified at this time and the quantities of the advertisement response behaviors of the known fraudulent users on the advertisement publishers, and the publisher identifier blacklist, for example, one or both of the traffic master identifier blacklist and the developer identifier blacklist, is determined according to re-determined fraudulent publishers.

Specifically, when data in the blacklist database is obtained based on the behavior record information of the historical advertisement response behaviors at the first time, the known fraudulent users may be the fraudulent sample users. When data in the blacklist database is obtained based on new behavior record information of historical advertisement response behaviors obtained through statistics again, the known fraudulent users include the fraudulent sample users and previous fraudulent users identified according to the behavior record information of the historical advertisement response behaviors. That is, every time data in the blacklist database is obtained based on the behavior record information of the historical advertisement response behaviors, types of advertisement publishers may be determined according to all current known fraudulent users, and after fraudulent users corresponding to behavior record information of current historical advertisement response behaviors are determined by using the fraud identification model, types of advertisement publishers at this time are determined based on updated fraudulent users, to further obtain the publisher identifier blacklist.

In some embodiments of this application, the obtaining the user identifier blacklist based on user identifiers of the fraudulent users in the advertisement response users can include obtaining the user identifier blacklist based on the user identifiers of the fraudulent users in the advertisement response users and user identifiers of the fraudulent sample users. The determining, according to quantities of advertisement response behaviors of the fraudulent users in the advertisement response users on advertisement publishers included in the behavior record information of the historical advertisement response behaviors, publisher types of the advertisement publishers included in the behavior record information of the historical advertisement response behaviors can include determining, according to quantities of advertisement response behaviors of all fraudulent users on advertisement publishers included in behavior record information of all advertisement response behaviors, publisher types of advertisement publishers included in the behavior record information of all the advertisement response behaviors. All the fraudulent users including the fraudulent users in the advertisement response users and the fraudulent sample users, and all the advertisement response behaviors including the historical advertisement response behaviors and the advertisement response behaviors of the training sample users. Further, the obtaining the advertisement publisher identifier blacklist based on identifiers of fraudulent publishers included in the behavior record information of the historical advertisement response behaviors can include obtaining the advertisement publisher identifier blacklist based on identifiers of fraudulent publishers included in the behavior record information of all the advertisement response behaviors.

That is, information in the blacklist database may further include information corresponding to the fraudulent sample users in the training sample data. The fraudulent sample users that are already known as fraudulent users and the fraudulent users identified by the model that are used during model training form a complete fraudulent user group, to obtain a blacklist database as comprehensive as possible based on information corresponding to all users in the group. In actual applications, to improve the accuracy of data in the blacklist database as much as possible, when data that needs to be added to the advertisement publisher identifier blacklist (the traffic master identifier blacklist or the developer identifier blacklist) is obtained, types of advertisement publishers may be determined according to quantities of advertisement response behaviors of all the users in the fraudulent user group on the advertisement publishers. Specifically, for example, for a traffic master, whether the traffic master is a fraudulent traffic master may be determined according to a proportion of a quantity of advertisement response behaviors of all the uses in the fraudulent user group on the traffic master to a quantity of advertisement response behaviors of all the advertisement response users and all the training sample users on the traffic master.

In some embodiments of this application, the initial deep learning model may be a Wide&Deep deep learning model. The Wide&Deep deep learning model, that is, Wide&Deep learning, is a deep learning model having both a Wide portion and a Deep portion. In some embodiments, the Wide portion may be implemented mainly by using logistic regression (LR), and an input layer of the Wide portion is directly connected to an output layer of the model, and the Deep portion, that is, a deep model portion, may mainly include a feature embedding layer (that is, an Embedding layer), at least one hidden layer, and an output layer. Wide&Deep learning can enable the fraud identification model obtained through training to have both a memorization capability and a generalization capability. By training the Wide&Deep deep learning model, parameters of the two portions can be simultaneously optimized during the training process, thereby achieving an optimal prediction capability of the entire model, so that a fraud identification model obtained through training based on the model can achieve a good identification effect.

It may be understood that the Wide&Deep deep learning model has both the Wide portion and the Deep portion, and input data required by the Wide portion and the Deep portion is usually different types of the data. For example, for the Wide portion, the portion corresponds to a linear model, and features of input data are generally consecutive features, but input data applicable to the Deep portion is usually some discrete data, that is, data having a sparse feature. In addition, by adding the Embedding layer in the Deep portion, the problem of a sparse data feature can be effectively resolved, thereby further improving the generalization capability of the Deep portion. Therefore, in actual applications, when the Wide&Deep deep learning model is selected, data that needs to be inputted to the model, that is, the input data of the model, may be configured according to characteristics of the model.

In some embodiments, when the Wide&Deep deep learning model is trained based on training sample data, for behavior record information of advertisement response behaviors of each training sample user, at least one of a user identifier (for example, a device identifier or an operating system version of the device), traffic master distribution information of the advertisement response behaviors on traffic masters, and developer distribution information of the advertisement response behaviors on developers is used as an input of the Deep portion of the model, and at least one of a proportion of advertisement response behaviors of the training sample user on at least one type of traffic master and a proportion of advertisement response behaviors of the training sample user on at least one type of developer is used as an input of the Wide portion of the model.

To better understand the method provided in the embodiments of this application, the solution of the embodiments of this application is further described in detail with reference to specific examples below.

Figure 3:
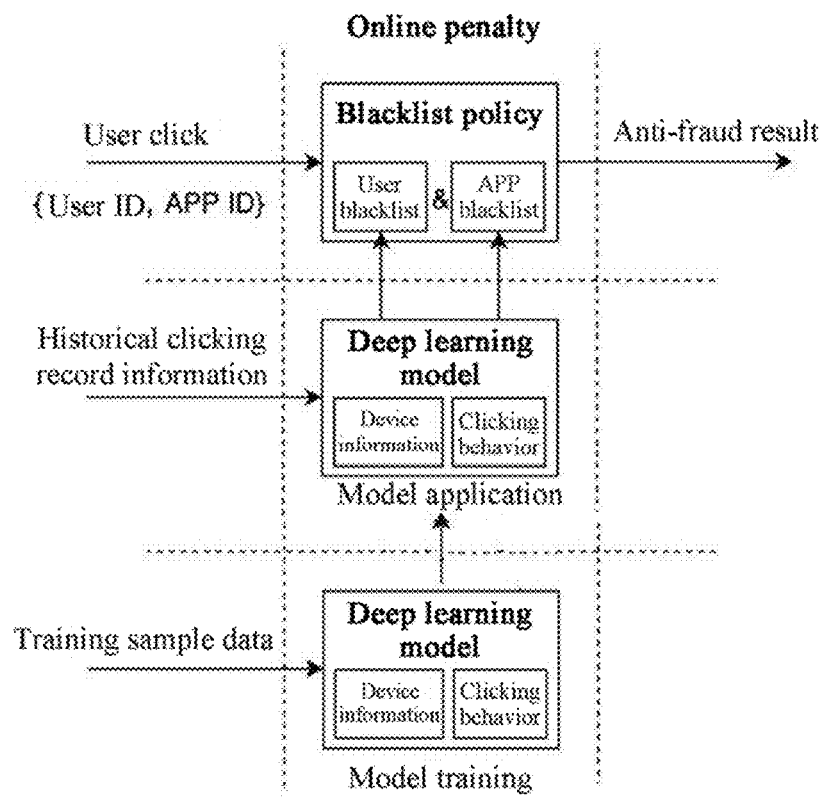
FIG. 3 is a schematic diagram of a system architecture according to an embodiment of this application.
Figure 4:
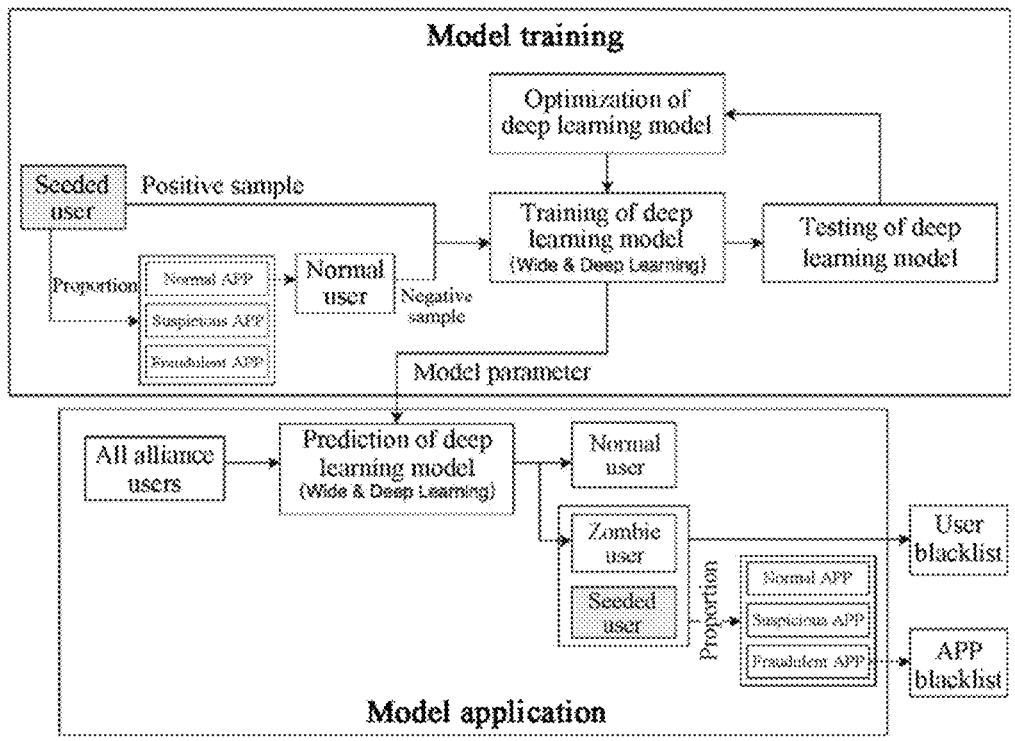
FIG. 4 is a schematic diagram of solutions of a training stage and an application stage of a fraud identification model according to an example of this application.

As an example, FIG. 3 is a schematic diagram of a system architecture to which the solution of the embodiments of this application is applicable. As shown in FIG. 3, the system architecture may include three portions: model training, model application, and online penalty from bottom to top. FIG. 4 is a schematic flowchart of a model training stage and a model application stage.

As shown in FIG. 3 and FIG. 4, in the model training stage, the initial deep learning model is trained based on training sample data, to obtain a fraud identification model (that is, the foregoing second fraud identification model). That is, a deep learning model of the model application stage is obtained. In the model application stage, data in the blacklist database may be obtained based on the behavior record information of the historical advertisement response behaviors of the advertisement response users by using the deep learning model.

In this example, the solution provided in the embodiments of this application is described by using an example in which traffic masters are APPs, the blacklist database (the blacklist policy portion shown in the figure) is a user identifier blacklist (the user blacklist shown in FIG. 3) and a traffic master identifier blacklist (the APP blacklist shown in FIG. 3), and the advertisement response behaviors are advertisement clicking behaviors.

In an off-line training stage, that is, the model training stage, training sample data may be first obtained based on initial sample data. Specifically, APPs are classified into normal APPs, suspicious APPs, and fraudulent APPs based on clicking proportions of seeded zombie users in the initial sample data on the APPs included in the initial sample data, and then, normal sample users having the same quantity as the seeded zombie users are randomly extracted from the normal APPs. Behavior record information (the behavior record information in this example is clicking record information) of advertisement clicking behaviors of the seeded zombie users are used as positive samples, and behavior record information of advertisement clicking behaviors of the normal sample users are used as negative samples, to train the initial deep learning model. Before the training sample data is inputted to the deep learning model, the training sample data may be first pre-processed, to obtain data satisfying requirements of input data of the model.

In this example, user identifiers (such as device models and operating system versions) and advertisement clicking behavior information (such as traffic master distribution information, clicking proportions on various types of traffic masters, and developer distribution information), that is, the foregoing publisher information, of sample users may be first obtained based on the training sample data. Then, pre-processed data is used as inputs of the deep learning model, to train the deep learning model, a model obtained through training is tested by using a test data set (that is, testing of the deep learning model shown in FIG. 4) after each training is ended, and the model is optimized according to performance of the model on the test data set (that is, optimization of the deep learning model shown in FIG. 4), until a deep learning model satisfying a training end condition is obtained. The deep learning model obtained after the training is completed is the deep learning model in the model application stage, that is, the fraud identification model.

In the model application stage, statistical data, that is, behavior record information of historical advertisement clicking behaviors of advertisement clicking users that is obtained through statistics (for example, behavior record information, obtained through statistics, of advertisement clicking behaviors of all users within three months before a time point) may be predicted based on model parameters obtained through training, that is, based on the deep learning model obtained after the training is completed. In this example, all advertisement clicking users in a mobile advertising alliance platform (which correspond to all alliance users shown in FIG. 4) are used as an example for description. Specifically, corresponding processing is performed based on the obtained behavior record information of the historical advertisement clicking behaviors of all the alliance users by using the deep learning model, to obtain the user blacklist and the APP blacklist. Because inputs of the deep learning model in the application stage are the same as inputs of the model in the training stage, before the behavior record information of the historical advertisement clicking behaviors are outputted to the model, the behavior record information of the historical advertisement clicking behaviors of the alliance users also needs to be correspondingly pre-processed, to obtain user identifiers and advertisement clicking behavior information of the alliance users. The pre-processed data is used as inputs of the deep learning model in the application stage, fraudulent users, that is, zombie users shown in the figure, in the behavior record information of the historical advertisement clicking behaviors may be identified based on outputs of the deep learning model, the zombie users identified by using the model and the seeded zombie users in the training stage together form a complete advertisement-related fraudulent zombie group, and user identifiers of all zombie users in the group are pushed to the user blacklist of an online penalty module, to identify online fraudulent clicks.

In addition, to obtain the APP blacklist, APPs having a high proportion of advertisement clicks of all the zombie users in the advertisement-related fraudulent zombie group to total clicks of the APPs may be further considered as fraudulent APPs, and the fraudulent APPs are pushed to the APP blacklist of the online penalty module. For example, for any APP, the type of the APP may be determined according to a proportion of a quantity of clicks of all the zombie users on the APP to a quantity of clicks of all users (all the alliance users and the training sample users) on the APP. If the proportion is not less than 30%, the APP is determined as a fraudulent APP. If the proportion is not greater than 10%, the APP is determined as a normal APP. If the proportion is greater than 10% and less than 30%, the APP is determined as a pending APP, that is, a suspicious APP.

In the online penalty stage, after a user generates one advertisement clicking behavior, an anti-fraud identification result may be obtained based on a detection result by detecting whether a user identifier (corresponding to the user ID shown in FIG. 3) of the user and a traffic master identifier (the APP ID shown in the figure) of a traffic master of an advertisement corresponding to the advertisement clicking behavior hit the blacklist. Specifically, when both the user identifier and the traffic master identifier hit the blacklist, or at least one of the identifiers hits the blacklist, the advertisement clicking behavior may be considered as an advertisement-related fraudulent behavior, that is, a fraudulent click. Conversely, when neither of the identifiers hits the blacklist, the advertisement clicking behavior is considered as a normal click.

In another example, the process of training the deep learning model in the embodiments of this application is further described by using an example in which the initial deep learning model is a Wide&Deep deep learning model, and the advertisement response behaviors are advertisement clicking behaviors.

Figure 5:
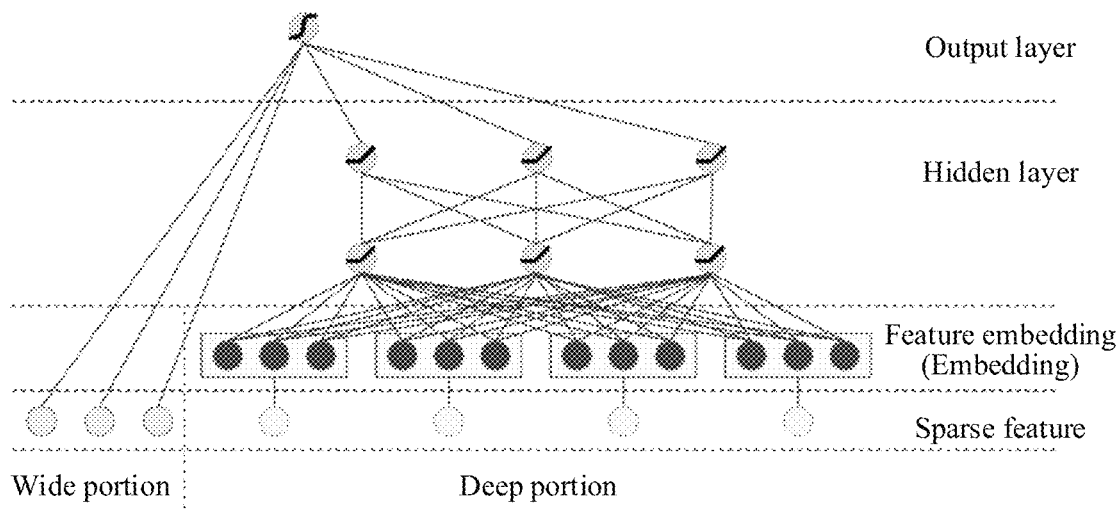
FIG. 5 is a schematic structural diagram of a deep learning model according to an example of this application.

FIG. 5 is a schematic structural diagram of a Wide&Deep deep learning model according to this example. As shown in the figure, the deep learning model includes a Wide portion and a Deep portion, and the model may be specifically classified into four levels: a sparse feature layer, a feature embedding layer, a hidden layer, and an output layer according to level division of the model from input to output, the sparse feature layer in the figure is an input layer of the model.

First, sample data needs to be obtained, and obtaining training sample data may be implemented in the foregoing described manner, for example, the manner of obtaining the training sample data in the examples of FIG. 3 and FIG. 4. Details are not described herein.

After the training sample data is obtained, a series of data pre-processing may be first performed on the training sample data, to obtain data satisfying an input data format of the sparse feature layer of the Wide&Deep deep learning model. Input data of the sparse feature layer is original features after pre-processing. In actual applications, the process of data pre-processing may be performed by using a data pre-processing module in the model or a data pre-processing module connected to the input layer of the model. That is, the data pre-processing module may be disposed outside the model, or may be disposed inside the model. When disposed inside the model, the data pre-processing module is used as a part of the model, and is connected to the input layer of the model, and outputs of the pre-processing module are inputs of the input layer, that is, the sparse feature layer.

In this example, the inputs of the sparse feature layer include features such as phone models (such as Huawei Mate 10), system versions (such as Android 9.0), clicked APP distribution, that is, traffic master distribution information (such as APP 1: 2 and APP 2: 1), clicked developer distribution, that is, developer distribution information (such as developer 1: 3 and developer 2: 2), clicking proportions on fraudulent APPs, clicking proportions on suspicious APPs, and clicking proportions on normal APPs of sample users. Features such as the phone models, system versions, clicked APP distribution, clicked developer distribution need to pass through the feature embedding layer, the hidden layer, to the output layer, thereby forming the Deep portion of the model and bringing the generalization capability of the model. Features such as the clicking proportions on fraudulent APPs, clicking proportions on suspicious APPs, and clicking proportions on normal APPs directly participate in calculation of the output layer, form the Wide portion of the model, and bring the memorization capability of the model.

Specifically, the feature embedding layer is used for converting a sparse feature into a dense feature with a specific dimension (such as a 100-dimension dense feature). For example, Huawei Mate 10 may be converted into a 100-dimensional vector of [0.12, 0.25, . . . , 0.36]. In some embodiments, the feature embedding layer may use a Skip-Gram model. The model may respectively embed a phone model, a phone model, a system version, a traffic master identifier, that is, the APP ID in this example, and a developer identifier, that is, the developer ID in this example, into a 100-dimensional vector by using a similarity between phone models, a similarity between system versions appearing in the same APP, a similarity between different APPs where advertisement clicks of the same user are located, and a similarity between corresponding developers. After the features are embedded, a cosine distance between feature vectors indicate a similarity between feature values. For example, a cosine distance between a feature vector of Huawei Mate 10 and a feature vector of Huawei Honor 10 is less than a cosine distance between a feature vector of Huawei Mate 10 and a feature vector of iPhone 8. That is, a similarity between Huawei Mate 10 and Huawei Honor 10 is greater than a similarity between Huawei Mate 10 and iPhone 8.

The hidden layer may be formed by using at least one layer (two layers are shown in FIG. 5) of fully connected neuron. In some embodiments, an activation function of the neuron may use a ReLU (rectified linear unit) function, inputs of the function are feature vectors after the feature embedding, and a dimension of an output is a quantity of neurons of the last layer.

The inputs of the output layer simultaneously include values obtained after feature embedding and hidden layer variation are performed on features of the Wide portion and features of the Deep portion. The output layer may use a SoftMax function, and the SoftMax function gives probability distribution of a classification result. Because determining whether a user is a fraudulent zombie user is a binary classification problem, an output result is also two-dimensional. That is, a sum of a probability that a user is a zombie user and a probability that the user is not a zombie is 1.

Based on probability distribution of the output layer of the deep learning model (Wide&Deep Learning), when a probability that a user is a zombie exceeds 50%, the user may be considered as a fraudulent zombie user. A complete fraudulent zombie group may be identified by applying the model to all advertisement clicking users (such as all users in the mobile advertising alliance).

Constant iterative training is performed on initial Wide & Deep Learning based on the pre-processed training sample data until a training end condition is satisfied. For example, when a trained model is tested by using a test data set, if the identification accuracy of the model is greater than a setting value, it may be considered that the model satisfies the training end condition, and the model obtained through training at this time is used as the fraud identification model of the model application stage.

In the model application stage, when whether a user is a fraudulent user is determined, a used probability threshold may be set according to actual requirements. For example, the probability threshold may be 50%, or may be another threshold selected as required. A higher set probability threshold indicates higher identification accuracy.

Figure 6:
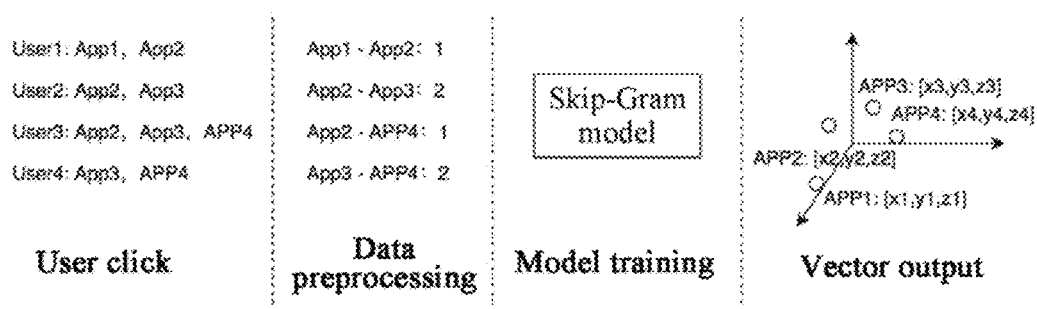
FIG. 6 is a schematic diagram of a data processing procedure of a feature embedding layer according to an example of this application.

In this example, a feature embedding procedure of the feature embedding layer (by using a Skip-Gram model as an example) in the Wide&Deep deep learning model shown in FIG. 5 is described by using an example in which the APP ID is a traffic master identifier. In this example, the feature embedding layer may be specifically configured to convert an APP ID into a three-dimensional feature vector. FIG. 6 shows a data processing procedure of the feature embedding layer, which is specifically as follows:

First, an APP list included in advertisement clicking record information of all users in the past three months may be obtained through statistics, the data pre-processing module may obtain a quantity of users of common clicks between each APP pair through statistics, a processing result of the data pre-processing module is inputted to the Skip-Gram model for training, and finally, the Skip-Gram model outputs feature vectors of the APPs.

Specifically, as shown in the figure, it may be obtained based on statistical data that: a user 1, that is, User 1, performs advertisement clicks on APP 1 and APP 2, User 2 performs advertisement clicks on APP 2 and APP 3, User 3 performs advertisement clicks on APP 2, APP 3, and APP 4, and User 4 performs advertisement clicks on APP 3 and APP 4. The data pre-processing module may obtain, by pre-processing the statistical data, a quantity of users of common clicks corresponding to each APP. For example, for an APP pair of APP 1 and APP 2, only User 1 performs advertisement clicks on both APPs. Therefore, a quantity of users of common clicks is 1, that is, APP 1-APP 2: 1 shown in the figure. In another example, for an APP pair of APP 2 and APP 3, both User 2 and User 3 perform advertisement clicks on the APP pair. Therefore, a quantity of users is 2, that is, APP 2-APP 3: 2 shown in the figure.

The processing result of the data pre-processing module is inputted to the Skip-Gram model, and an output of the Skip-Gram model is a three-dimensional feature vector corresponding to each APP ID. For example, a feature vector of APP 1 is [x1,y1,z1] shown in the figure.

FIG. 6 only shows an implementation of the feature embedding layer. In actual applications, the feature embedding layer may be configured according to actual requirements.

The solution provided in the embodiments of this application is implemented from the most importance resource of a dark industry chain of advertisement-related fraud, that is, users, according to a similarity between device information and a similarity between advertisement response behaviors of advertisement-related fraudulent users. By using the solution, not only a blacklist may be established for fraudulent users that already appear, but also newly appeared fraudulent users may be identified by using the fraud identification model, so that a complete system for preventing advertisement-related fraud may be established, which greatly increases fraud costs and improves the anti-fraud efficiency, thereby effectively reduce loss of advertisers. In addition, the solution can be extensively applied to various application scenarios that need fraud identification, for example, may be applied to detection of a fraudulent IP group, detection of a fraudulent QQ group, detection of a fraudulent WeChat group, and the like. Correspondingly, for different application scenarios, a blacklist database including corresponding blacklist information is selected. For example, for identification of advertisement-related fraudulent behaviors in the fraudulent IP group, the blacklist database may include an IP address blacklist.

Figure 7:
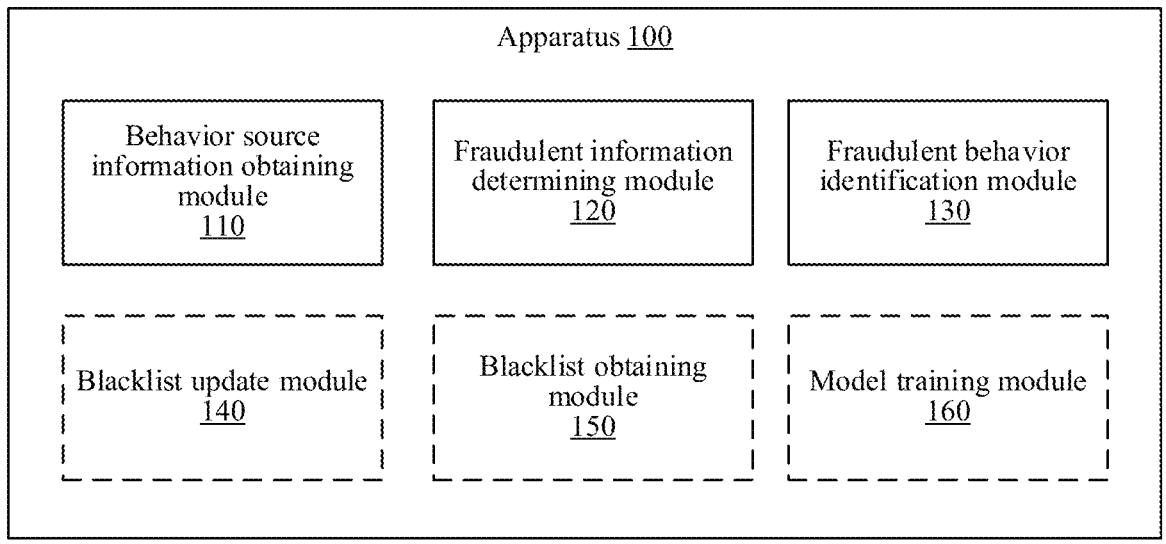
FIG. 7 is a schematic structural diagram of an apparatus for preventing advertisement-related fraud according to an embodiment of this application.

Based on the same principle of the method shown in FIG. 2, an embodiment of this application further provides an apparatus for preventing advertisement-related fraud. As shown in FIG. 7, the apparatus 100 for preventing advertisement-related fraud may include a behavior source information obtaining module 110, a fraudulent information determining module 120, and a fraudulent behavior identification module 130. Of course, it should be understood that one or more of the modules described in this specification can be implemented by hardware, such as circuitry.

The behavior source information obtaining module 110 is configured to obtain behavior source information of a current advertisement response behavior, the behavior source information of the current advertisement response behavior being information used for indicating a generation source of the current advertisement response behavior.

The fraudulent information determining module 120 is configured to determine, according to a similarity between the behavior source information of the current advertisement response behavior and known fraudulent behavior source information, whether the behavior source information of the current advertisement response behavior is fraudulent behavior source information.

The fraudulent behavior identification module 130 is configured to determine, in a case that the behavior source information of the current advertisement response behavior is the fraudulent behavior source information, that the current advertisement response behavior is an advertisement-related fraudulent behavior.

In some embodiments, the fraudulent information determining module 120 is further configured to determine, in a case that at least one piece of information in the behavior source information of the current advertisement response behavior exists in a blacklist database, that the behavior source information of the current advertisement response behavior is the fraudulent behavior source information, the blacklist database storing the known fraudulent behavior source information. Further, the fraudulent information determining module 120 can input the behavior source information of the current advertisement response behavior to a first fraud identification model, and determine, according to an output of the first fraud identification model, whether the behavior source information of the current advertisement response behavior is the fraudulent behavior source information, the first fraud identification model being a model that is trained based on the known fraudulent behavior source information and used for identifying whether behavior source information is fraudulent behavior source information.

In some embodiments, the apparatus 100 further includes a blacklist update module 140, configured to add, in a case that the behavior source information of the current advertisement response behavior is the fraudulent behavior source information, and at least one piece of information in the behavior source information of the current advertisement response behavior does not exist in the blacklist database, the information that does not exist in the blacklist database, in the behavior source information of the current advertisement response behavior to the blacklist database.

In some embodiments, the behavior source information of the current advertisement response behavior includes at least one of the following: an identifier of a current user generating the current advertisement response behavior and an identifier of an advertisement publisher of an advertisement corresponding to the current advertisement response behavior.

In some embodiments, the advertisement publisher of the advertisement corresponding to the current advertisement response behavior includes at least one of the following: a traffic master of the advertisement corresponding to the current advertisement response behavior and a developer corresponding to the traffic master of the advertisement corresponding to the current advertisement response behavior.

In some embodiments, the identifier of the current user includes at least one of the following: a model and an operating system version of a device used by the user, an IP address corresponding to the device, and login account information used by the user.

In some embodiments, the apparatus 100 further includes a blacklist obtaining module 150, configured to: obtain behavior record information of historical advertisement response behaviors of advertisement response users, the behavior record information of the historical advertisement response behaviors including behavior source information of the historical advertisement response behaviors, and obtain the blacklist database by using a second fraud identification model based on the behavior record information of the historical advertisement response behaviors, the second fraud identification model being a model that is trained based on behavior record information of advertisement response behaviors and used for identifying fraudulent behavior source information.

In some embodiments, the apparatus 100 further includes a model training module 160, configured to obtain training sample data, the training sample data including behavior record information of advertisement response behaviors of training sample users, and the training sample users including normal sample users and fraudulent sample users, and use behavior record information of advertisement response behaviors of the fraudulent sample users as positive samples, use behavior record information of advertisement response behaviors of the normal sample users as negative samples, train an initial deep learning model based on the training sample data to obtain a deep learning model that satisfies a training end condition, and use the deep learning model that satisfies the training end condition as the second fraud identification model.

In some embodiments, in a case that the behavior record information of the advertisement response behaviors of the training sample users includes identifiers of advertisement publishers of advertisements corresponding to the advertisement response behaviors of the training sample users, when training the initial deep learning model based on the training sample data, the model training module 160 is further configured to determine publisher information of the training sample users according to the identifiers of the advertisement publishers in the behavior record information of the advertisement response behaviors of the training sample users. The publisher information including at least one piece of the following information: publisher distribution information of the advertisement publishers of the advertisements corresponding to the advertisement response behaviors and a proportion of advertisement response behaviors on at least one type of advertisement publishers to the advertisement response behaviors, an advertisement publisher type including a fraudulent publisher, a pending publisher, and a normal publisher. Further, the model training module can train the initial deep learning model by using the publisher information of the training sample users as inputs of the initial deep learning model.

In some embodiments, in a case that the behavior record information of the advertisement response behaviors of the training sample users includes identifiers of the training sample users, when training the initial deep learning model based on the training sample data, the model training module 160 is further configured to train the initial deep learning model by using the identifiers of the training sample users as inputs of the initial deep learning model.

In some embodiments, when obtaining the training sample data, the model training module 160 is further configured to obtain initial sample data, the initial sample data including the behavior record information of the advertisement response behaviors of the fraudulent sample users and behavior record information of advertisement response behaviors of pending users, and determine, according to quantities of advertisement response behaviors of the fraudulent sample users on advertisement publishers in the initial sample data, publisher types of the advertisement publishers included in the initial sample data. Further, the model training module can be configure to use users, in the pending users, that have a proportion, of advertisement response behaviors on normal publishers to advertisement response behaviors of the users, satisfying a setting condition as the normal sample users, and use the behavior record information of the advertisement response behaviors of the fraudulent sample users and the behavior record information of the advertisement response behaviors of the normal sample users as the training sample data.

In some embodiments, in a case that the behavior record information of the advertisement response behaviors of the training sample users includes identifiers of the training sample users, outputs of the second fraud identification model are user type tags, the user type tags being used for indicating whether a user is a fraudulent user or a normal user.

In some embodiments, the blacklist database includes at least one of a user identifier blacklist and an advertisement publisher identifier blacklist, and in a case that the blacklist database includes the user identifier blacklist, when obtaining the blacklist database by using the second fraud identification model, the blacklist obtaining module 150 is further configured to determine fraudulent users in the advertisement response users based on the outputs of the second fraud identification model, and obtain the user identifier blacklist based on user identifiers of the fraudulent users in the advertisement response users. When the blacklist database includes the advertisement publisher identifier blacklist, when obtaining the blacklist database by using the second fraud identification model, the blacklist obtaining module 150 is further configured to determine fraudulent users in the advertisement response users based on the outputs of the second fraud identification model, determine, according to quantities of advertisement response behaviors of the fraudulent users in the advertisement response users on advertisement publishers included in the behavior record information of the historical advertisement response behaviors, publisher types of the advertisement publishers included in the behavior record information of the historical advertisement response behaviors, and obtain the advertisement publisher identifier blacklist based on identifiers of fraudulent publishers included in the behavior record information of the historical advertisement response behaviors.

In some embodiments, when obtaining the user identifier blacklist based on user identifiers of the fraudulent users in the advertisement response users, the blacklist obtaining module 150 is further configured to obtain the user identifier blacklist based on the user identifiers of the fraudulent users in the advertisement response users and user identifiers of the fraudulent sample users. When determining, according to the quantities of the advertisement response behaviors of the fraudulent users in the advertisement response users on the advertisement publishers included in the behavior record information of the historical advertisement response behaviors, the publisher types of the advertisement publishers included in the behavior record information of the historical advertisement response behaviors, the blacklist obtaining module 150 can be further configured to determine, according to quantities of advertisement response behaviors of all fraudulent users on advertisement publishers included in behavior record information of all advertisement response behaviors, publisher types of advertisement publishers included in the behavior record information of all the advertisement response behaviors, all the fraudulent users including the fraudulent users in the advertisement response users and the fraudulent sample users, and all the advertisement response behaviors including the historical advertisement response behaviors and the advertisement response behaviors of the training sample users. When obtaining the advertisement publisher identifier blacklist based on the identifiers of the fraudulent publishers included in the behavior record information of the historical advertisement response behaviors, the blacklist obtaining module 150 is further configured to obtain the advertisement publisher identifier blacklist based on identifiers of fraudulent publishers included in the behavior record information of all the advertisement response behaviors.

In some embodiments, the initial deep learning model is a Wide&Deep deep learning model.

The apparatus provided in the embodiments of this application is an apparatus that may perform the method in the embodiments of this application. Therefore, based on the method provided in the embodiments of this application, a person skilled in the art can learn specific implementations of the apparatus in the embodiments of this application and various variations thereof, and a manner in which the apparatus implements the method in the embodiments of this application is not described in detail herein. All apparatuses used when a person skilled in the art implements the method in the embodiments of this application shall fall within the protection scope of this application.

Based on the same principle of the method and apparatus provided in the embodiments of this application, an embodiment of this application further provides an electronic device. The electronic device may include a processor and a memory. The memory stores readable instructions. The readable instructions, when loaded and executed by the processor, may implement the method shown in any embodiment of this application.

An embodiment of this application further provides a non-transitory computer-readable storage medium, storing computer-readable instructions, the computer-readable instructions, when loaded and executed by a processor, implementing the method shown in any embodiment of this application.

Figure 8:
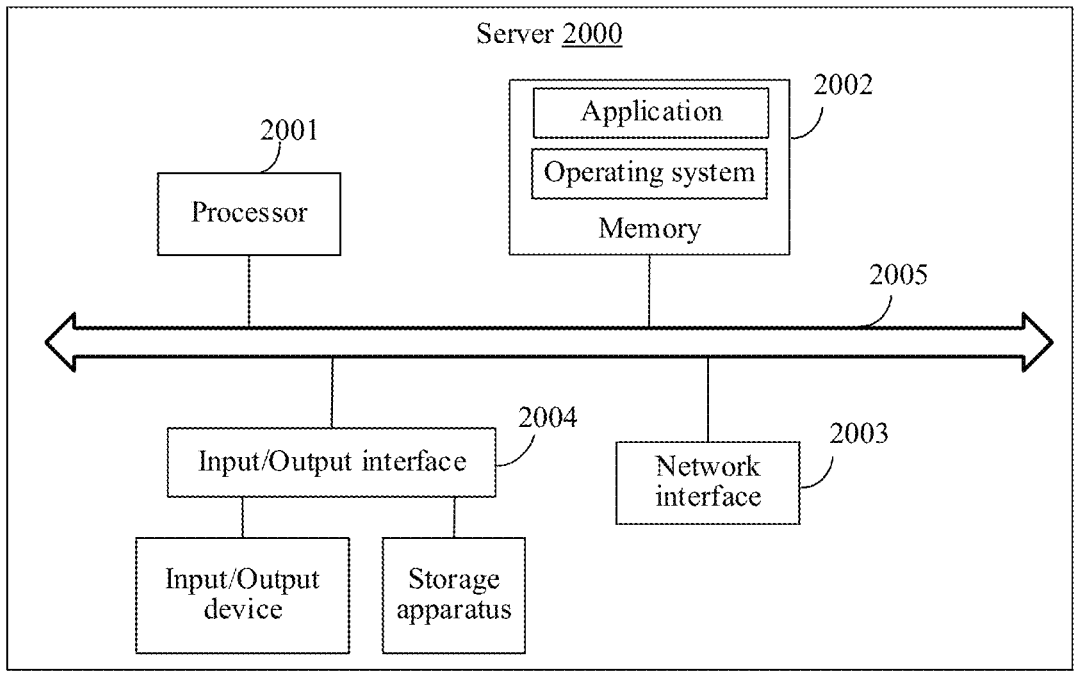
FIG. 8 is a schematic structural diagram of a server according to an embodiment of this application.

FIG. 8 is a schematic structural diagram of an electronic device to which the embodiments of this application are applicable. As shown in FIG. 8, the electronic device may be specifically a server, and the server may be configured to implement the method for preventing advertisement-related fraud shown in any embodiment of this application.

As shown in FIG. 8, the server 2000 may mainly include components such as at least one processor 2001, a memory 2002, a network interface 2003, and an input/output interface 2004. Connection and communication between the components may be implemented by using a bus 2005.

The memory 2002 may be configured to store an operating system, an application, and the like. The application may include program code or instructions implementing the method shown in the embodiments of this application when calling by the processor 2001, or may include a program used for implementing other functions or services.

The memory 2002 may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, a disk storage medium or another magnetic storage device, or any other medium that can be used to carry or store expected program code in a command or data structure form and that can be accessed by a computer, but is not limited thereto.

The processor 2001 is connected to the memory 2002 by using the bus 2005, and implements corresponding functions by calling the application stored in the memory 2002. The processor 2001 may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content disclosed in this application. The processor 2001 may be alternatively a combination to implement a computing function, for example, may be a combination of one or more microprocessors, or a combination of a DSP and a microprocessor.

The server 2000 may be connected to a network by using the network interface 2003, to communicate with another device, for example a user terminal device or another server, by using the network for implementing data exchange. The network interface 2003 may include a wired network interface and/or a wireless network interface.

The server 2000 may be connected to a required input/output device, such as a keyboard or a display device, by using the input/output interface 2004, and may be further connected to a storage apparatus such as a hard disk, by using the interface, so that data in the server 2000 may be stored into the storage apparatus, or data in the storage apparatus is stored into the server 2000. It may be understood that, the input/output interface 2004 may be a wired interface or a wireless interface. According to different actual application scenarios, a device connected to the input/output interface 2004 may be a component of the server 2000, or may be an external device connected to the server 2000 as required.

The bus 2005 configured to connect the components may include a channel, to transmit information between the foregoing components. The bus system 2005 may be a peripheral component interconnect (PCI) bus, an extended industry standard architecture (EISA) bus, or the like. According to different functions, the bus 2005 may be classified into an address bus, a data bus, a control bus, and the like.

In some embodiments, for the solution provided in the embodiments of this application, the memory 2002 may be configured to store application program code for performing the solution of this application, and is controlled and executed by the processor 2001. The processor 2001 is configured to execute application program code stored in the memory 2002 to implement the method or actions of the apparatus provided in the embodiments of this application.

Figure 9:
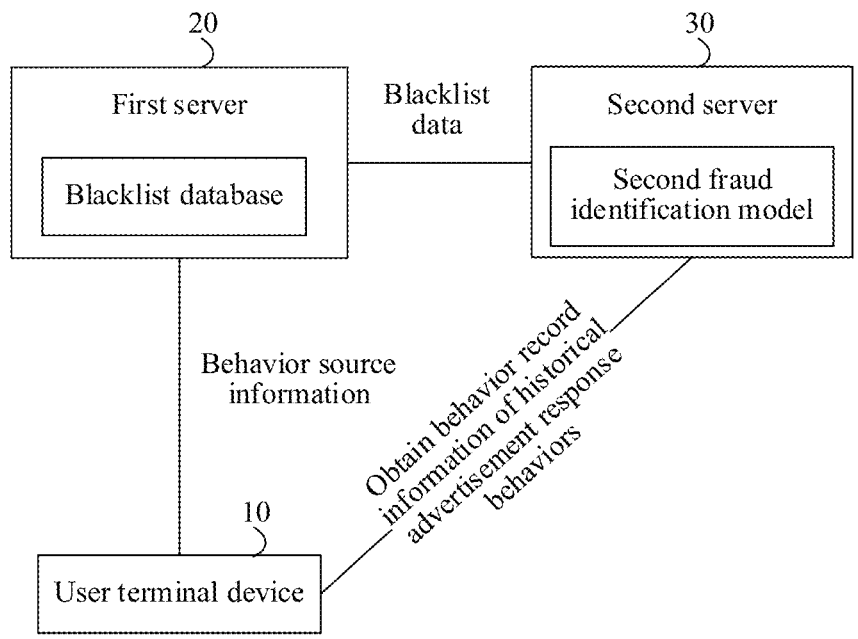
FIG. 9 is a schematic diagram of a system architecture according to an embodiment of this application.

FIG. 9 is a schematic diagram of a system architecture to which the solution of this application is applicable according to an embodiment of this application. As shown in the figure, the system architecture may include a user terminal device 10, a first server 20, and a second server 30. Only one user terminal device is schematically drawn in the figure. In actual applications, there may be a large quantity of user terminal devices. The user terminal device 10 may be respectively in communication connection with the first server 20 and the second server 30. In the system architecture, the second fraud identification model in the embodiments of this application may be deployed in the second server 30. The second server 30 may obtain behavior record information of advertisement response behaviors of users on the user terminal device 10, may collect statistics and perform aggregation on obtained data according to a pre-configured time interval (such as two months), that is, perform aggregation on the behavior record information of the advertisement response behaviors of the users obtained within the first two months, to obtain behavior record information of historical advertisement response behaviors corresponding to the users of terminal devices, and obtain blacklist data by using the second fraud identification model based on the behavior record information of the historical advertisement response behaviors. Every time the second server 30 obtains the blacklist data, the second server sends the blacklist data to the first server 20. The first server 20 may update and perfect the data in the blacklist database based on the blacklist data obtained from the second server 30. The first server 20 may obtain behavior source information of an advertisement response behavior performed by a user on the user terminal device 10, and identify whether the advertisement response behavior of the user is an advertisement-related fraudulent behavior according to whether the behavior source information hits information in the blacklist database.

In actual applications, the first server 20 and the second server 30 may be the same server. That is, the blacklist database and the second fraud identification model may be deployed in the same server. For example, when the solution of the embodiments of this application is applied to the online advertising system including the mobile advertising alliance, the same server may be a backend server of the mobile advertising alliance.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this application. A person of ordinary skill in the art may make several improvements and refinements without departing from the principle of this application, and the improvements and refinements shall fall within the protection scope of this application.

What is claimed is:

1. A method for preventing advertisement-related fraud that is performed by a server, the method comprising:
   generating a user blacklist and an application (app) blacklist by applying a trained deep learning prediction model and model parameters obtained through training to historical advertisement response behavior of an advertising platform, the trained deep learning prediction model being configured to
   (i) classify each user generating the historical advertisement response behavior as a normal user or a fraudulent user,
   (ii) add each fraudulent user to the user blacklist, and
   (iii) add an app to the app blacklist in response to a determination that a proportion of a quantity of clicks of all the fraudulent users on the app to a quantity of clicks of all advertisement clicking users and training sample users on the app is above a threshold;
   obtaining behavior source information of a current advertisement response behavior, the behavior source information indicating a generation source of the current advertisement response behavior including a user identifier of a user that generated the current advertisement response and an app identifier of the app in which the user generated the current advertisement response;
   determining whether the behavior source information of the current advertisement response behavior is fraudulent behavior source information based on a similarity between the user identifier and the app identifier of the behavior source information of the current advertisement response behavior and known fraudulent behavior source information including the user blacklist and the app blacklist; and
   determining that the current advertisement response behavior is an advertisement-related fraudulent behavior when the behavior source information of the current advertisement response behavior is the fraudulent behavior source information.

2. The method according to claim 1, wherein the behavior source information of the current advertisement response behavior further comprises an identifier of an advertisement publisher of an advertisement corresponding to the current advertisement response behavior.

3. The method according to claim 2, wherein the user identifier of the user further comprises at least one of:
   a model, an operating system version, and an IP address of a device used by the user and login account information used by the user.

4. The method according to claim 1, wherein the determining whether the behavior source information of the current advertisement response behavior is fraudulent behavior source information further comprises:
   inputting the behavior source information of the current advertisement response behavior to a first fraud identification model, and
   determining whether the behavior source information of the current advertisement response behavior is the fraudulent behavior source information based on an output of the first fraud identification model, the first fraud identification model being a model that is trained based on the known fraudulent behavior source information and used for identifying whether behavior source information is fraudulent behavior source information.

5. The method according to claim 1, wherein the determining whether the behavior source information of the current advertisement response behavior is fraudulent behavior source information further comprises:
   determining that the behavior source information of the current advertisement response behavior is the fraudulent behavior source information when another piece of information in the behavior source information of the current advertisement response behavior exists in a blacklist database that stores the known fraudulent behavior source information.

6. The method according to claim 5, further comprising:
   adding, when the behavior source information of the current advertisement response behavior is the fraudulent behavior source information and at least one of the user identifier, the app identifier, or the another piece of information in the behavior source information of the current advertisement response behavior does not exist in the blacklist database, the information that does not exist in the blacklist database to the blacklist database.

7. The method according to claim 1, further comprising:
   obtaining training sample data including behavior record information of advertisement response behaviors of training sample users, and the training sample users including normal sample users and fraudulent sample users; and
   using behavior record information of advertisement response behaviors of the fraudulent sample users as positive samples, using behavior record information of advertisement response behaviors of the normal sample users as negative samples, and training an initial deep learning model based on the training sample data to obtain the trained deep learning prediction model that satisfies a training end condition.

8. The method according to claim 7, wherein, when the behavior record information of the advertisement response behaviors of the training sample users includes identifiers of advertisement publishers of advertisements corresponding to the advertisement response behaviors of the training sample users, the training the initial deep learning model based on the training sample data further comprises:
   determining publisher information of the training sample users based on the identifiers of the advertisement publishers in the behavior record information of the advertisement response behaviors of the training sample users, the publisher information including at least one of:
   publisher distribution information of the advertisement publishers of the advertisements corresponding to the advertisement response behaviors, a portion of advertisement response behaviors directed to at least one type of advertisement publisher, an advertisement publisher type including a fraudulent publisher, a pending publisher, and a normal publisher; and
   training the initial deep learning model by using the publisher information of the training sample users as inputs of the initial deep learning model.

9. The method according to claim 7, wherein when the behavior record information of the advertisement response behaviors of the training sample users includes identifiers of the training sample users, the training an initial deep learning model based on the training sample data further comprises:
   training the initial deep learning model by using the identifiers of the training sample users as inputs of the initial deep learning model.

10. The method according to claim 7, wherein the obtaining training sample data further comprises:
    obtaining initial sample data including the behavior record information of the advertisement response behaviors of the fraudulent sample users and behavior record information of advertisement response behaviors of pending users;
    determining publisher types of the advertisement publishers included in the initial sample data based on quantities of advertisement response behaviors of the fraudulent sample users on advertisement publishers in the initial sample data, the publisher types including a fraudulent publisher, a pending publisher, and a normal publisher;
    using users, in the pending users, that have a portion of advertisement response behaviors directed to normal publishers to advertisement response behaviors of the users satisfying a setting condition as the normal sample users; and
    using the behavior record information of the advertisement response behaviors of the fraudulent sample users and the behavior record information of the advertisement response behaviors of the normal sample users as the training sample data.

11. The method according to claim 10, wherein, when the behavior record information of the advertisement response behaviors of the training sample users includes identifiers of the training sample users, outputs of the trained deep learning prediction model are user type tags, the user type tags being used for indicating whether a user is a fraudulent user or a normal user.

12. An apparatus for preventing advertisement-related fraud, the apparatus comprising: processing circuitry configured to generate a user blacklist and an application (app) blacklist by applying a trained deep learning prediction model and model parameters obtained through training to historical advertisement response behavior of an advertising platform, the trained deep learning prediction model being configured to
    (i) classify each user generating the historical advertisement response behavior as a normal user or a fraudulent user,
    (ii) add each fraudulent user to the user blacklist, and
    (iii) add an app to the app blacklist in response to a determination that a proportion of a quantity of clicks of all the fraudulent users on the app to a quantity of clicks of all advertisement clicking users and training sample users on the app is above a threshold;
    obtain behavior source information of a current advertisement response behavior, the behavior source information indicating a generation source of the current advertisement response behavior including a user identifier of a user that generated the current advertisement response and an app identifier of the app in which the user generated the current advertisement response;
    determine whether the behavior source information of the current advertisement response behavior is fraudulent behavior source information based on a similarity between the user identifier and the app identifier of the behavior source information of the current advertisement response behavior and known fraudulent behavior source information including the user blacklist and the app blacklist; and
    determine that the current advertisement response behavior is an advertisement-related fraudulent behavior when the behavior source information of the current advertisement response behavior is the fraudulent behavior source information.

13. The apparatus according to claim 12, wherein the processing circuitry is further configured to:
    input the behavior source information of the current advertisement response behavior to a first fraud identification model, and determine whether the behavior source information of the current advertisement response behavior is the fraudulent behavior source information based on an output of the first fraud identification model, the first fraud identification model being a model that is trained based on the known fraudulent behavior source information and used for identifying whether behavior source information is fraudulent behavior source information.

14. The apparatus according to claim 12, wherein the processing circuitry is further configured to:
    determine that the behavior source information of the current advertisement response behavior is the fraudulent behavior source information when another piece of information in the behavior source information of the current advertisement response behavior exists in a blacklist database that stores the known fraudulent behavior source information.

15. The apparatus according to claim 14, the processing circuitry being configured to perform operations further comprising:
    adding, when the behavior source information of the current advertisement response behavior is the fraudulent behavior source information and at least one of the user identifier, the app identifier, or the another piece of information in the behavior source information of the current advertisement response behavior does not exist in the blacklist database, the information that does not exist in the blacklist database to the blacklist database.

16. A non-transitory computer-readable storage medium storing computer-readable instructions that, when loaded and executed by a processor, cause the processor to implement a method for preventing advertisement-related fraud comprising:
generating a user blacklist and an application (app) blacklist by applying a trained deep learning prediction model and model parameters obtained through training to historical advertisement response behavior of an advertising platform, the trained deep learning prediction model being configured to
(i) classify each user generating the historical advertisement response behavior as a normal user or a fraudulent user,
(ii) add each fraudulent user to the user blacklist, and
(iii) add an app to the app blacklist in response to a determination that a proportion of a quantity of clicks of all the fraudulent users on the app to a quantity of clicks of all advertisement clicking users and training sample users on the app is above a threshold;
obtaining behavior source information of a current advertisement response behavior, the behavior source information indicating a generation source of the current advertisement response behavior including a user identifier of a user that generated the current advertisement response and an app identifier of an the app in which the user generated the current advertisement response; determining whether the behavior source information of the current advertisement response behavior is fraudulent behavior source information based on a similarity between the user identifier and the app identifier of the behavior source information of the current advertisement response behavior and known fraudulent behavior source information including the user blacklist and the app blacklist; and determining that the current advertisement response behavior is an advertisement-related fraudulent behavior when the behavior source information of the current advertisement response behavior is the fraudulent behavior source information.

* * * * *

UNITED STATES PATENT AND TRADEMARK OFFICE
CERTIFICATE OF CORRECTION

PATENT NO. : 12,081,560 B2
APPLICATION NO. : 17/214139
DATED : September 3, 2024
INVENTOR(S) : Quan Cheng Page 1 of 1

It is certified that error appears in the above-identified patent and that said Letters Patent is hereby corrected as shown below:

On the Title Page

Item (71), the Applicant city reads as:
Guangdong (CN)
Should read as:
--Shenzhen (CN)--

Item (73), the Assignee city reads as:
Guangdong (CN)
Should read as:
--Shenzhen (CN)--

Signed and Sealed this
Eighth Day of October, 2024

Katherine Kelly Vidal
*Director of the United States Patent and Trademark Office*